(12) United States Patent
Holling

(10) Patent No.: US 12,282,599 B1
(45) Date of Patent: Apr. 22, 2025

(54) SYSTEMS AND METHODS FOR FACILITATING PRESENTATION OF AN OBJECT

(71) Applicant: Frank Holling, Siracha (TH)

(72) Inventor: Frank Holling, Siracha (TH)

( * ) Notice: Subject to any disclaimer, the term of this patent is extended or adjusted under 35 U.S.C. 154(b) by 0 days.

(21) Appl. No.: 18/895,150

(22) Filed: Sep. 24, 2024

(51) Int. Cl.
*G06F 3/01* (2006.01)
*G06F 3/14* (2006.01)
*G06T 15/20* (2011.01)

(52) U.S. Cl.
CPC .............. *G06F 3/013* (2013.01); *G06F 3/14* (2013.01); *G06T 15/20* (2013.01); *G06T 2200/24* (2013.01)

(58) Field of Classification Search
CPC .......................... G06F 3/011–015; G06F 3/017
See application file for complete search history.

(56) References Cited

U.S. PATENT DOCUMENTS

| | | | | |
|---|---|---|---|---|
| 8,442,600 B1* | 5/2013 | Tseng | .................. | H04M 1/0268 455/566 |
| 8,463,328 B1* | 6/2013 | Tseng | .................... | G06F 1/1652 455/566 |
| 8,644,885 B1* | 2/2014 | Tseng | .................... | G06F 1/1652 455/566 |
| 8,816,972 B2* | 8/2014 | Solomon | .................. | G09G 3/20 345/173 |
| 9,288,836 B1* | 3/2016 | Clement | ................ | A44C 5/105 |
| 9,405,432 B2* | 8/2016 | Vats | ..................... | G06F 3/04815 |
| 9,911,243 B2* | 3/2018 | Vats | ........................ | G10L 13/08 |
| 10,025,549 B1* | 7/2018 | Welck | ..................... | G09G 3/001 |
| 10,063,822 B2* | 8/2018 | Hattingh | .............. | H04N 9/3194 |
| 10,403,054 B2* | 9/2019 | Moncayo | ................ | G06T 19/20 |
| 11,435,583 B1* | 9/2022 | Pedder | ................. | G02B 5/0242 |
| 11,577,159 B2* | 2/2023 | Mandella | ................ | A63F 13/53 |
| 11,582,424 B1* | 2/2023 | Kasaba | .................. | G06V 40/28 |
| 12,034,879 B1* | 7/2024 | Kushwaha | .......... | H04M 1/0268 |
| 12,141,930 B2* | 11/2024 | Perlin | ....................... | G06T 7/70 |

(Continued)

FOREIGN PATENT DOCUMENTS

WO WO-2015000129 A1 * 1/2015
WO 2015140815 A1 9/2015

OTHER PUBLICATIONS

Interactive Human 3D Model with Conventional AI, retrieved from the internet, retrieved on Sep. 23, 2024; <URL: https://www.ijraset.com/research-paper/interactive-human-3d-model-with-conventional-ai>.

(Continued)

*Primary Examiner* — Patrick F Marinelli

(57) ABSTRACT

The present disclosure provides a system for facilitating presentation of an object. Further, the system may include a processing device which may be configured to execute an instruction associated with presenting two or more views of an object. Further, each view of based on a three-dimensional model data corresponding to the object. Further, the system may include a display device operatively coupled with the processing device. Further, the display device may include two or more display regions which may be configured to display the two or more views of the object. Further, the two or more display regions comprising a first display region which may be configured to display a first view of the object and a second display region which may be configured to display a second view of the object.

19 Claims, 20 Drawing Sheets

(56) References Cited

U.S. PATENT DOCUMENTS

| | | | | |
|---|---|---|---|---|
| 2009/0295592 | A1* | 12/2009 | Mizukawa | G07G 1/145 340/691.5 |
| 2012/0162204 | A1* | 6/2012 | Vesely | G06F 3/0325 345/419 |
| 2014/0208272 | A1* | 7/2014 | Vats | G06F 3/04845 715/852 |
| 2015/0103018 | A1* | 4/2015 | Kamin-Lyndgaard | G06F 3/0443 345/173 |
| 2016/0027218 | A1* | 1/2016 | Salter | G02B 27/0093 345/633 |
| 2016/0307374 | A1* | 10/2016 | Kurz | G06F 3/012 |
| 2017/0103584 | A1* | 4/2017 | Vats | G06T 19/20 |
| 2017/0124770 | A1* | 5/2017 | Vats | G06T 19/00 |
| 2018/0053352 | A1* | 2/2018 | Finding | H04N 23/23 |
| 2019/0251892 | A1* | 8/2019 | Stoll | A63F 13/213 |
| 2020/0050342 | A1 | 2/2020 | Lee | |
| 2021/0283496 | A1* | 9/2021 | Mandella | H04N 23/60 |
| 2021/0400822 | A1* | 12/2021 | Cavallaro | H05K 1/028 |
| 2022/0330438 | A1* | 10/2022 | Igor | G09F 9/302 |
| 2023/0350222 | A1* | 11/2023 | Castleman | G09G 3/003 |
| 2023/0359468 | A1* | 11/2023 | Sivagnanenthirarajah | G06F 9/54 |
| 2023/0409650 | A1* | 12/2023 | Kumar | G06F 16/9535 |
| 2024/0210997 | A1* | 6/2024 | Myers | H05K 7/06 |
| 2024/0302865 | A1* | 9/2024 | Myers | G06F 1/1694 |
| 2024/0310878 | A1* | 9/2024 | Pailla | G06F 1/1652 |
| 2024/0370086 | A1* | 11/2024 | Hsieh | G09G 5/10 |
| 2024/0371088 | A1* | 11/2024 | Bérard | G06T 17/00 |

OTHER PUBLICATIONS

Thawait, Naveen. (2024). Exploring Interactive 3D Human Models: Integrating Conventional AI Techniques for Enhanced User Experience. International Journal of Progressive Research in Engineering Management and Science. 4. 1934-1940. 10.58257/IJPREMS35155.

* cited by examiner

SYSTEMS AND METHODS FOR FACILITATING PRESENTATION OF AN OBJECT

FIELD OF THE INVENTION

The present disclosure generally relates to computer graphics processing and selective visual display system. More specifically, the present disclosure relates to systems and methods for facilitating presentation of an object.

BACKGROUND OF THE INVENTION

In recent times the usage of personal phones or communication devices has widely spread over the whole world population. So much it has influenced the social behavior of people. The disclosed system is meant to give people a more natural, more attractive, more user-friendly experience in the daily handling and operating of a portable phone or digital computing and communication device.

Today's electronic devices are able to access a large, growing, and diverse quantity of functions, services, and information, both via the Internet and from other sources. Functionality for such devices is increasing rapidly, as many consumer devices, smartphones, tablet computers, and the like, are able to run software applications to perform various tasks and provide different types of information. Often, each application, function, website, or feature has its own user interface and its own operational paradigms, many of which are burdensome to learn or overwhelming for users. In addition, many users may have difficulty even discovering what functionality and/or information is available on their electronic devices or on various websites; thus, such users may become frustrated or overwhelmed or may simply be unable to use the resources available to them in an effective manner.

In particular, novice users, or individuals who are impaired or disabled in some manner, and/or are elderly, busy, distracted, and/or operating a vehicle may have difficulty interfacing with the electronic devices effectively, and/or engaging online services effectively. Such users are particularly likely to have difficulty with the large number of diverse and inconsistent functions, applications, and websites or other information that may be available for the use or review.

Accordingly, existing systems are often difficult to use and to navigate, and often present users with inconsistent and overwhelming interfaces that often prevent the users from making effective use of the technology.

SUMMARY OF THE INVENTION

This summary is provided to introduce a selection of concepts in a simplified form that are further described below in the Detailed Description. This summary is not intended to identify key features or essential features of the claimed subject matter. Nor is this summary intended to be used to limit the claimed subject matter's scope.

The present disclosure provides a system for facilitating presentation of an object. Further, the system may include a processing device which may be configured to execute an instruction associated with presenting two or more views of an object. Further, each view is based on a three-dimensional model data corresponding to the object. Further, the system may include a display device operatively coupled with the processing device. Further, the display device may include two or more display regions which may be configured to display two or more views of the object. Further, the two or more display regions may include a first display region which may be configured to display a first view of the object and a second display region which may be configured to display a second view of the object.

The present disclosure provides a system for facilitating presentation of an object. Further, the system may include a processing device which may be configured to execute an instruction associated with presenting two or more views of an object. Further, each view may be based on a three-dimensional model data corresponding to the object. Further, the system may include a display device operatively coupled with the processing device. Further, the display device may include two or more display regions which may be configured to display the two or more views of the object. Further, the two or more display regions may include a first display region which may be configured to display a first view of the object and a second display region which may be configured to display a second view of the object. Further, the system may include a sensor coupled with the processing device. Further, the sensor may be configured to determine a spatial position of a user in relation to the display device. Further, the processing device may be further configured for updating one or more display regions of the two or more display regions based on the spatial position.

The present disclosure provides a system for facilitating presentation of an object. Further, the system may include a processing device which may be configured to execute an instruction associated with presenting two or more views of a digital character comprising characteristic of one or more of a human and a humanoid. Further, each view may be based on a three-dimensional model data corresponding to the digital character. Further, the system may include a display device operatively coupled with the processing device. Further, the display device may include two or more display regions which may be configured to display the two or more views of the digital character. Further, the two or more display regions may include a first display region which may be configured to display a first view of the digital character and a second display region which may be configured to display a second view of the digital character.

Both the foregoing summary and the following detailed description provide examples and are explanatory only. Accordingly, the foregoing summary and the following detailed description should not be considered to be restrictive. Further, features or variations may be provided in addition to those set forth herein. For example, embodiments may be directed to various feature combinations and sub-combinations described in the detailed description.

BRIEF DESCRIPTION OF DRAWINGS

The accompanying drawings, which are incorporated in and constitute a part of this disclosure, illustrate various embodiments of the present disclosure. The drawings contain representations of various trademarks and copyrights owned by the Applicants. In addition, the drawings may contain other marks owned by third parties and are being used for illustrative purposes only. All rights to various trademarks and copyrights represented herein, except those belonging to their respective owners, are vested in and the property of the applicants. The applicants retain and reserve all rights in their trademarks and copyrights included herein, and grant permission to reproduce the material only in connection with reproduction of the granted patent and for no other purpose.

Furthermore, the drawings may contain text or captions that may explain certain embodiments of the present disclosure. This text is included for illustrative, non-limiting, explanatory purposes of certain embodiments detailed in the present disclosure.

DETAILED DESCRIPTION OF THE INVENTION

Figure 1:
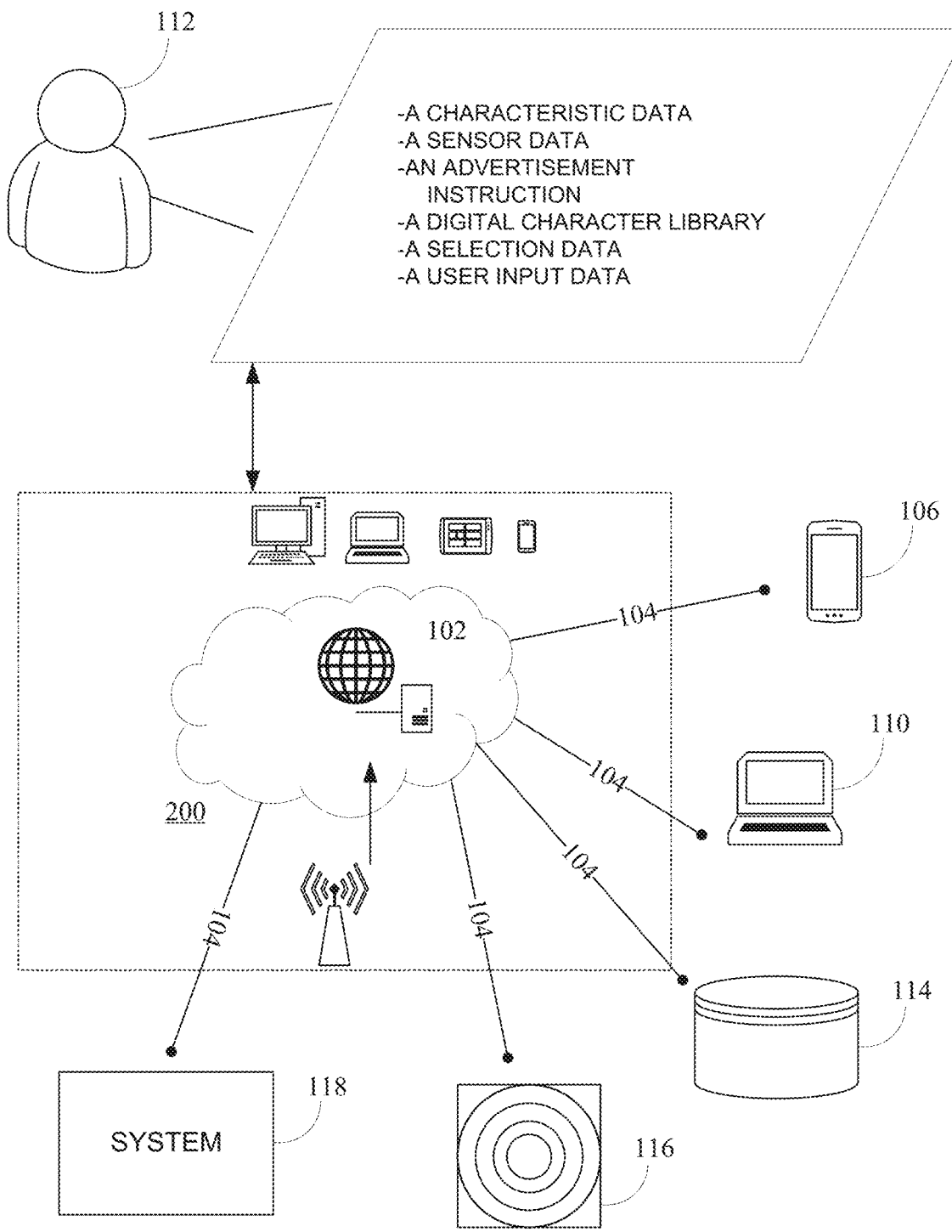
FIG. 1 is an illustration of an online platform 100 consistent with various embodiments of the present disclosure.

As a preliminary matter, it will readily be understood by one having ordinary skill in the relevant art that the present disclosure has broad utility and application. As should be understood, any embodiment may incorporate only one or a plurality of the above-disclosed aspects of the disclosure and may further incorporate only one or a plurality of the above-disclosed features. Furthermore, any embodiment discussed and identified as being "preferred" is considered to be part of a best mode contemplated for carrying out the embodiments of the present disclosure. Other embodiments also may be discussed for additional illustrative purposes in providing a full and enabling disclosure. Moreover, many embodiments, such as adaptations, variations, modifications, and equivalent arrangements, will be implicitly disclosed by the embodiments described herein and fall within the scope of the present disclosure.

Accordingly, while embodiments are described herein in detail in relation to one or more embodiments, it is to be understood that the present disclosure is illustrative and exemplary of the present disclosure and are made merely for the purposes of providing a full and enabling disclosure. The detailed disclosure herein of one or more embodiments is not intended, nor is to be construed, to limit the scope of patent protection afforded in any claim of a patent issuing here from, which scope is to be defined by the claims and the equivalents thereof. It is not intended that the scope of patent protection be defined by reading into any claim limitation found herein and/or issuing here from that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present disclosure. Accordingly, it is intended that the scope of patent protection is to be defined by the issued claim(s) rather than the description set forth herein.

Additionally, it is important to note that each term used herein refers to that which an ordinary artisan would understand such term to mean based on the contextual use of such term herein. To the extent that the meaning of a term used herein—as understood by the ordinary artisan based on the contextual use of such term—differs in any way from any particular dictionary definition of such term, it is intended that the meaning of the term as understood by the ordinary artisan should prevail.

Furthermore, it is important to note that, as used herein, "a" and "an" each generally denote "at least one" but do not exclude a plurality unless the contextual use dictates otherwise. When used herein to join a list of items, "or" denotes "at least one of the items" but does not exclude a plurality of items of the list. Finally, when used herein to join a list of items, "and" denotes "all of the items of the list".

The following detailed description refers to the accompanying drawings. Wherever possible, the same reference numbers are used in the drawings and the following description to refer to the same or similar elements. While many embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the claims found herein and/or issuing here from. The present disclosure contains headers. It should be understood that these headers are used as references and are not to be construed as limiting upon the subjected matter disclosed under the header.

The present disclosure may include many aspects and features. Moreover, while many aspects and features relate to, and are described in the context of the disclosed use cases, embodiments of the present disclosure are not limited to use only in this context.

In general, the method disclosed herein may be performed by one or more computing devices. For example, in some embodiments, the method may be performed by a server computer in communication with one or more client devices over a communication network such as, for example, the Internet. In some other embodiments, the method may be performed by one or more of at least one server computer, at least one client device, at least one network device, at least one sensor and at least one actuator. Examples of the one or more client devices and/or the server computer may include, a desktop computer, a laptop computer, a tablet computer, a personal digital assistant, a portable electronic device, a wearable computer, a smart phone, an Internet of Things (IoT) device, a smart electrical appliance, a video game console, a rack server, a super-computer, a mainframe computer, mini-computer, micro-computer, a storage server, an application server (e.g., a mail server, a web server, a real-time communication server, an FTP server, a virtual server, a proxy server, a DNS server, etc.), a quantum computer, and so on. Further, one or more client devices and/or the server computer may be configured for executing a software application such as, for example, but not limited to, an operating system (e.g., Windows, Mac OS, Unix, Linux, Android, etc.) in order to provide a user interface (e.g., GUI, touch-screen based interface, voice based interface, gesture based interface, etc.) for use by the one or more users and/or a network interface for communicating with other devices over a communication network. Accordingly, the server computer may include a processing device configured for performing data processing tasks such as, for example, but not limited to, analyzing, identifying, determining, generating, transforming, calculating, computing, compressing, decompressing, encrypting, decrypting, scrambling, splitting, merging, interpolating, extrapolating, redacting, anonymizing, encoding and decoding. Further, the server computer may include a communication device configured for communicating with one or more external devices. The one or more external devices may include, for example, but are not limited to, a client device, a third-party database, public database, a private database and so on. Further, the communication device may be configured for communicating with the one or more external devices over one or more communication channels. Further, the one or more communication channels may include a wireless communication channel and/or a wired communication channel. Accordingly, the communication device may be configured for performing one or more of transmitting and receiving of information in electronic form. Further, the server computer may include a storage device configured for performing data storage and/or data retrieval operations. In general, the storage device may be configured for providing reliable storage of digital information. Accordingly, in some embodiments, the storage device may be based on technologies such as, but not limited to, data compression, data backup, data redundancy, deduplication, error correction, data fingerprinting, role-based access control, and so on.

Further, one or more steps of the method disclosed herein may be initiated, maintained, controlled and/or terminated based on a control input received from one or more devices operated by one or more users such as, for example, but not limited to, an end user, an admin, a service provider, a service consumer, an agent, a broker and a representative thereof. Further, the user as defined herein may refer to a human, an animal or an artificially intelligent being in any state of existence, unless stated otherwise, elsewhere in the present disclosure. Further, in some embodiments, the one or more users may be required to successfully perform authentication in order for the control input to be effective. In general, a user of the one or more users may perform authentication based on the possession of a secret human readable secret data (e.g., username, password, passphrase, PIN, secret question, secret answer, etc.) and/or possession of a machine readable secret data (e.g., encryption key, decryption key, bar codes, etc.) and/or or possession of one or more embodied characteristics unique to the user (e.g., biometric variables such as, but not limited to, fingerprint, palm-print, voice characteristics, behavioral characteristics, facial features, iris pattern, heart rate variability, evoked potentials, brain waves, and so on) and/or possession of a unique device (e.g., a device with a unique physical and/or chemical and/or biological characteristic, a hardware device with a unique serial number, a network device with a unique IP/MAC address, a telephone with a unique phone number, a smartcard with an authentication token stored thereupon, etc.). Accordingly, the one or more steps of the method may include communicating (e.g., transmitting and/or receiving) with one or more sensor devices and/or one or more actuators in order to perform authentication. For example, the one or more steps may include receiving, using the communication device, the secret human readable data from an input device such as, for example, a keyboard, a keypad, a touch-screen, a microphone, a camera and so on. Likewise, the one or more steps may include receiving, using the communication device, the one or more embodied characteristics from one or more biometric sensors.

Further, one or more steps of the method may be automatically initiated, maintained and/or terminated based on one or more predefined conditions. In an instance, the one or more predefined conditions may be based on one or more contextual variables. In general, the one or more contextual variables may represent a condition relevant to the performance of the one or more steps of the method. The one or more contextual variables may include, for example, but are not limited to, location, time, identity of a user associated with a device (e.g., the server computer, a client device, etc.) corresponding to the performance of the one or more steps, environmental variables (e.g., temperature, humidity, pressure, wind speed, lighting, sound, etc.) associated with a device corresponding to the performance of the one or more steps, physical state and/or physiological state and/or psychological state of the user, physical state (e.g., motion, direction of motion, orientation, speed, velocity, acceleration, trajectory, etc.) of the device corresponding to the performance of the one or more steps and/or semantic content of data associated with the one or more users. Accordingly, the one or more steps may include communicating with one or more sensors and/or one or more actuators associated with the one or more contextual variables. For example, the one or more sensors may include, but are not limited to, a timing device (e.g., a real-time clock), a location sensor (e.g., a GPS receiver, a GLONASS receiver, an indoor location sensor, etc.), a biometric sensor (e.g., a fingerprint sensor), Face detection, an environmental variable sensor (e.g., temperature sensor, humidity sensor, pressure sensor, etc.) and a device state sensor (e.g., a power sensor, a voltage/current sensor, a switch-state sensor, a usage sensor, etc. associated with the device corresponding to performance of the or more steps).

Further, the one or more steps of the method may be performed one or more number of times. Additionally, the one or more steps may be performed in any order other than as exemplarily disclosed herein, unless explicitly stated otherwise, elsewhere in the present disclosure. Further, two or more steps of the one or more steps may, in some embodiments, be simultaneously performed, at least in part. Further, in some embodiments, there may be one or more time gaps between performances of any two steps of the one or more steps.

Further, in some embodiments, the one or more predefined conditions may be specified by the one or more users. Accordingly, the one or more steps may include receiving, using the communication device, the one or more predefined conditions from one or more and devices operated by the one or more users. Further, the one or more predefined conditions may be stored in the storage device. Alternatively, and/or additionally, in some embodiments, the one or more predefined conditions may be automatically determined, using the processing device, based on historical data corresponding to performance of the one or more steps. For example, the historical data may be collected, using the storage device, from a plurality of instances of performance of the method. Such historical data may include performance actions (e.g., initiating, maintaining, interrupting, terminating, etc.) of the one or more steps and/or the one or more contextual variables associated therewith. Further, machine learning may be performed on the historical data in order to determine the one or more predefined conditions. For instance, machine learning on the historical data may determine a correlation between one or more contextual variables and performance of the one or more steps of the method. Accordingly, the one or more predefined conditions may be generated, using the processing device, based on the correlation.

Further, one or more steps of the method may be performed at one or more spatial locations. For instance, the method may be performed by a plurality of devices interconnected through a communication network. Accordingly, in an example, one or more steps of the method may be performed by a server computer. Similarly, one or more steps of the method may be performed by a client computer. Likewise, one or more steps of the method may be performed by an intermediate entity such as, for example, a proxy server. For instance, one or more steps of the method may be performed in a distributed fashion across the plurality of devices in order to meet one or more objectives. For example, one objective may be to provide load balancing between two or more devices. Another objective may be to restrict a location of one or more of an input data, an output data and any intermediate data there between corresponding to one or more steps of the method. For example, in a client-server environment, sensitive data corresponding to a user may not be allowed to be transmitted to the server computer. Accordingly, one or more steps of the method operating on the sensitive data and/or a derivative thereof may be performed at the client device.

Overview

The present disclosed system describes an intelligent automated audio-visual assistant, also referred to herein as an intelligent digital character as interface, human or humanoid digital character, or interactive digital character, may provide an improved interface between a human and hand hold or pocket computer. Such an interface allows users to interact with a device or system using natural language, in spoken and/or text forms. Such an interface interprets user inputs, operationalizes the user's intent into tasks and parameters to those tasks, executes services to support those tasks, and produces output that is intelligible to the user.

An intelligent digital character as interface may draw on any of a number of sources of information to process user input, including for example voice command of the user, or any other voice input, or facial expressions of a user, for example blinking of an eye is interpreted as mouse click. Voice commands are converted to text using widely available speech to text systems, and the output text is interpreted using natural language processor to derive meaningful instructions. Facial expressions or body movements are captured with one or more cameras and interpreted using widely available image recognition and pattern recognition systems.

Artificial neural network and other widely available artificial intelligence technologies make it possible to make intelligent decisions based on input data; for example, driving cars based on camera and other sensor inputs, making intelligent conversation with a user based on voice or text input of a human user, giving shopping or video recommendations based on historical usage data of a user, moving a robot a perform tasks like playing sports or taking orders at a restaurant. Many other widely used and widely available artificial intelligence systems make it feasible for an intelligent digital character as interface to make intelligent conversation with a user. Current progress in motion detection technology and image recognition technology makes it easier to process images of facial expressions of a user and derive information from them using pattern recognition technology or artificial neural network. Advances in three-dimensional (3D) graphics and 3D image rendering have made it possible to build a 3D model of a human or humanoid and have that model move and talk like a real human being. Combining all these technologies it is now possible to build an intelligent digital character as interface system that takes voice command or facial expressions of a user as input and in response generates image rendering of a 3D model of a human or humanoid shape that moves and talks. Such a 3D v digital character can thus make intelligent conversation with a user, make eye contacts, perform tasks based on user's voice command, and perform other human assistant like actions.

An automated digital character may provide a beneficial interface between human users and electronic devices. Such intelligent digital character as interface may allow users to interact with devices or systems using natural language in spoken and/or text forms. For example, a user may provide a speech input including a user request to the digital character operating on an electronic device. The digital character may interpret the user's intent from the speech input and operationalize the user's intent into one or more tasks. The tasks are performed by executing one or more services of the electronic device, and a relevant output responsive to the user request is returned to the user.

Despite technical advances, the user interfaces provided by portable devices or computing devices provide an unfriendly user experience in many cases. Even with an automated digital assistant the user interface is not always user friendly, and sometimes literally "unfriendly". In many cases users are forced to interact with the device in an unnatural way or not human-like way. Portable devices have come a long way from the old hardware-button small-keyboards layout to modern day big touchscreen with finger-swiping or finger-tipping interaction or voice-based interaction. Such devices with touch screen and voice-based interaction is much more appealing, inspiring, and stimulating to the users compared to the hardware key based interaction, because it is a more natural way of human interaction. However, the most appealing, inspiring, and stimulating interaction experience for the user is to communicate and interact with another person or another simulated intelligent person. As we can observe from the immense popularity of A.I. Robots in movies.

Other objects and advantages may become apparent from the following description and accompanying drawings. None of the previous inventions and patents, taken either singly or in combination, is seen to describe the instant disclosed system as claimed. Hence, disclosed system proposes to resolve and surmount existent technical difficulties to eliminate the shortcomings of above prior arts.

The computing and communication device with digital character interface visible on an all-around screen disclosed system uses a human or humanoid like moving image or moving two- or three-dimensional model, representing an intelligent digital character as interface on the all-around screen from front, side edges, to backside of a computing device along with artificially intelligent interaction with the user, using visual communication, voice, sound, or other inputs and graphics animation, visual representation, deep learning based pattern recognition and decision making, natural human like movement processing, natural language processing based text and sound output, or other outputs. The human or humanoid like moving image or moving two- or three-dimensional intelligent digital character represents a more natural user interface for the computing device, rather just voice and sound-based user interface of a computing device, for example, Apple Siri™, Amazon Alexa™, or Google Assistant™.The disclosed system provides multiple choices of human or humanoid intelligent digital characters moving images or moving two- or three-dimensional model representations from which a specific one is selected to be used, or other style characters that may be purchased. The chosen digital character is optionally decorated with additional accessories, looks, moods, and other features, which may be additionally purchased or is bundled with the initial choice of the digital character, similar to a role playing game where game playing characters are built from multiple choices of parts and additional accessories are added. However, with the interactive digital character appears to be present inside the device case, giving it a robotic character in usage.

The moving animated character listens, talks, and makes eye contact with the user. The level of human-like communication feels more like a friend than a device. These are chosen from many available personalities. Some examples include, but are not limited to Sci-Fi friend, Robot friend, Girlfriend, Boyfriend, Fairy friend, or other types of friends or characters that are developed to fit and appeal to a specific user's groups.

To create the perception of the user that the friendly animated personality of comes alive in the phone, a unique new design concept of blending software and hardware has been developed. The disclosed system uses a transparent casing with a foldable screen behind it. This extends the normal phone screen to a complete 360 degrees coverage over the whole phone case. Only the main screen at the front has a touch interface. The design enables the user to see his or her moving and turning of the interactive digital character from all sides, as if it is in the real environment creating virtual reality.

First, the interactive digital character may move, turn, listen, have eye contact and speaks while in the hand of the user and performs the phone operation on demand. The robotic personality looks photo-realistic, but animation has to be simple and with computer generated sounding voice to avoid the robotic personality appearing like a video. The simple animation, the possibility of the robotic personality to follow the user with the eyes, and the visual appearance through the whole disclosed system casing gives a true impression that the interactive digital character has come alive as a robotic A.I. personality.

Second, the intelligent digital character looks through the phone cameras and remembers the name or the user. With this technique the interactive digital may follow the face of the user with the eyes. When the phone is turned on its side or back forwards the interactive digital character may react on that in-character.

Third, the interactive digital character is also the user interface of the phone. The user may ask the A.I. friend character to perform specific tasks. We may see the task being performed on a presented transparent menu display that the interactive digital character shows. The menu display is touch sensitive and may also be used for fully manual touch control. It is possible to change the given task with a touch of the finger or keep it manual for further usage. Just talk to the interactive digital character, and the phone comes back in robot mode and may give an answer or performs a new task. All functions of the phone may be performed by the A.I. Robot friend, when holding disclosed device in the hand or just lying on a table. Thus, hand free operations are possible.

Fourth, in standard mode, the disclosed system shows the interactive digital character from all sides. This may be changed in 'private mode' that shows the interactive digital character only at the front main screen. Just for preferred choice, or temporarily, for maintaining user privacy if needed in certain situations. The 'private mode' enables another unique feature to change the disclosed system case look with a plethora of selectable design styles that may be shown on the all-around case screen. The user may change the appearance of the disclosed system again and again whenever wanted, and without purchasing new accessories. The easiest way to personalize a phone ever.

Fifth, the A.I. robotic operating system of disclosed system is designed to socialize with the user. The interactive digital character may listen and talk like a real friend, may be attentive, charming, or funny. Available A.I. personalities may be further developed with a new look and new behavior possibilities even when the phone is already owned. Thus, the user may change the look of the chosen A.I. personality. Just downloaded for a price.

Sixth, Product Placement is an advertising technique used in movies by designing a natural looking scene showing the movie star using a specific product brand. For the first time ever in a phone, Product Placement advertising is now possible directly in the robotic character operating system of the disclosed system The A.I. character may have natural conversations and interaction with the user and show a new movie poster, or in a dinner date scene drink a Coke. Endless sponsored scenes may be designed in-character of the used interactive digital character personality and uploaded by the phone manufacturer for profitable product advertising, without being too obvious or boring for the user.

Seventh, a key factor to enable the effectiveness of the interactive digital character appearance, is disclosed system of an all-around screen-case design. This enables change in the perception of the user from using a phone device, to the effect of having a robotic A.I. friend in the hand. New hardware may be developed or existing may be used or further developed. A half round screen or a flexible screen are existing technologies that may both be used to create the effect in the new A.I discloses system.

Eighth, all concepts are exclusively designed for the disclosed system to give the consumer a new user experience. The disclosed system may be the next generation of smart phones. The disclosed system may open new markets and brings new commercial possibilities. A real A.I interface that communicates with the user visually and through speech as a robotic friend character that operates the phone and performs tasks, which is new for a phone. An all-around screen-casing that brings the interactive digital character alive. A selectable A.I character and thus phone appearance to fit different types of consumers. Expandable with new characters for a consumer price. Popular movie characters possible in collaboration with copyright holders. Available for a consumer price. Manual touch menu function is also still possible. Personalization of the phone look through the casing screen for selectable case designs. Expandable with new case designs for a consumer price. Social functions of the A.I. robotic character. Product placement advertising is possible in the phone interface.

The A.I. robotic character or the intelligent friend character provides the user interface of the device. The moving two- or three-dimensional graphical representation of the human or humanoid looking intelligent digital character or intelligent friend interacts with the user in a friendly or intimate manner to provide a very user-friendly user interface of the device. The intelligent friendly interaction with the intelligent digital character using currently well-established technologies such as natural language processing, text to speech processing, speech to text pattern recognition, user facial expression recognition, deep learning, knowledge base, and artificial intelligence in general, gives an impression of friendly context sensitive conversation, and as a result provides a friendly interaction experience with the device.

The front screen curves or rounds around the edges to the back and forms an all-around screen, the portable device facilitating the viewing of the moving images representing the digital character from all directions. Advances in current OLED screen making technology facilitate building curved edged front and back screen which together forms an all-around screen around the device when the curved edges touch each other. Building an all-around screen behind a transparent casing, where at the front of the device the screen curves or rounds around the edges to the back, is also possible with current OLED screen technology. A front to back all-around screen facilitates screening of all the sides of a three-dimensional digital character which is the intelligent friendly interface. The three-dimensional digital character of the human or humanoid looking intelligent friend is rendered using ray-tracing and other three-dimensional graphics technologies. The three-dimensional digital character also moves using motion captured movement sequences, image transition technology, and artificial intelligent facial expression rendering techniques. Such realistic moving representation of the three-dimensional digital character on the all-around screen along with artificial intelligent voice and speech interaction provides the user with a virtual realistic friendly and intimate experience.

Different hardware and software parts of the current disclosed system are outlined below.

Hardware: The disclosed system, or portable computing and communication device disclosed system does not have a normal phone case but uses an all-around image screen behind a transparent glass or plastic case, to create images or moving images on all sides of the device.

Hardware: (A) The new design feature of an all-around screen is made with a 1 peace foldable non-touch screen wrapped around the device to cover the front side and back side and all corners and rounded edges. Hold in place by 2 half transparent glass or plastic rounded edge case pieces that are put together, and an inner device frame. (B) A second option to create a new design feature is to use 2 rounded edge non-touch screens for front and back side of the device put together to form a total screen from back to front. Protected by 2 half transparent glass or plastic rounded edge case pieces that fit around the 2 rounded screens that are put together. (C) Any other screen technology not mentioned to make an all-around image screen on a phone or portable computing and communication device with the purpose to create images or moving images on all sides of the device and/or creates a 360-degree view.

Hardware: At the front side of the disclosed system, or portable computing and communication device disclosed system, is a cut out space in the all-around image screen at the front side to fit a conventional flat rectangular touch sensitive screen as the main front screen of the device. The designed screen composition enables a 360-degree view of presented images, while the device may be held in the hand for usage, with touch operations also available at the conventional flat rectangular front screen part.

Software: A visual animated and speaking intelligent digital character as interface of a phone device, or portable computing and communication device that may perform given tasks to operate the phone device. A humanoid or human-like visually animated and speaking character as the interface of a phone device, or portable computing and communication device that may perform given tasks to operate the phone device. A visible and speaking digital A.I. robotic presentation as the interface of a phone device, or portable computing and communication device that may perform given tasks to operate the phone device. A visible and speaking interactive digital character and intelligent digital animated character as the interface of a phone device, or portable computing and communication device that may perform given tasks to operate the phone device.

Software and hardware: A visual and speaking intelligent digital character as interface, or speaking and visual animated digital assistant, and all mentioned in point 4, of a phone or portable computing and communication device, made visible on an all-around screen that covers the front, back, and all sides of the device, and seen from all sides through a transparent case, giving an impression as if the speaking and moving intelligent digital character is present inside the device, making the phone or portable computing and communication device come alive as a robotic personality.

Software: A visible and speaking intelligent digital character on a screen that is the user interface of a phone or portable computing and communication device, or all mentioned in point 4, may present a menu display that shows the progress of given tasks by speech or gesture of the user. The presented menu display also enables the user to manually control the phone by touching the icons on the presented menu display if needed.

Software: A visible and speaking intelligent digital character on a screen of a phone or portable computing and communication device, or all mentioned in point 4 that communicates, and interacts visually, with movement and with voice, socializes and performs social role play in a human-like way with the user.

Software: The possibility to choose different style characters of the visible and speaking intelligent digital character on a screen as interface of a phone or portable computing and communication device, or all mentioned in point 4.

Software: The possibility to optionally change details in appearance, and behavior of the visible and speaking intelligent digital character on a screen as interface of a phone or portable computing and communication device, or all mentioned in point 4.

Software and hardware: The possibility to capture a live moving image of the location where the user is in, with the backside camera of the device while the user holds the phone in front of the face and let the device use the live captured moving image as the background of the visual and speaking intelligent digital character, or all mentioned in point 4. Creating an effect as if the character is in the same location as the user. A virtually reality illusion made by the all-around screen that creates a seamless visual effect together with the real location.

Software: The possibility to create 'product placement advertising' as it is called in the movie industry if movie scenes are created to show brand products. The disclosed system, or portable computing and communication device disclosed system can perform a profit generating style of advertising directly in the operating system and interface of the device. Meaning that in role play socializing interaction scenes with the device user, the visible and speaking intelligent digital character, or all mentioned in point 4, can show or hold products in the hand, and optional promoting the products with the voice in a way that fits the role play situation and the personality of the visible and speaking intelligent digital character.

Reference throughout this specification to "an aspect", "another aspect" or similar language means that a particular feature, structure, or characteristic described in connection with the embodiment is included in at least one embodiment of the present disclosed system. Thus, appearances of the phrase "in an embodiment", "in another embodiment" and similar language throughout this specification may, but do not necessarily, all refer to the same embodiment.

The terms "comprises", "comprising", or any other variations thereof, are intended to cover a non-exclusive inclusion, such that a process or method that comprises a list of steps does not include only those steps but may include other steps not expressly listed or inherent to such process or method. Similarly, one or more devices or sub-systems or elements or structures or components proceeded by "comprises . . . a" does not, without more constraints, preclude the existence of other devices or other sub-systems or other elements or other structures or other components or additional devices or additional sub-systems or additional elements or additional structures or additional components.

Unless otherwise defined, all technical and scientific terms used herein have the same meaning as commonly understood by one of ordinary skill in the art to which this invention belongs. The system, methods, and examples provided herein are illustrative only and not intended to be limiting.

Embodiments of the present disclosed system may be described below in detail with reference to the accompanying drawings.

In the following description, for purposes of explanation, numerous specific details are set forth in order to provide an understanding of various embodiments of the present subject matter. It may be evident, however, to those skilled in the art that various embodiments may be practiced without these specific details.

A digital assistant, also referred to as a virtual assistant, is a software agent that is configurable to perform tasks for a user. Examples of digital assistants include Apple Siri, Google Assistant, Amazon Alexa, and Microsoft Cortana. Digital assistants typically interact with users via one or more of text (e.g., online chat, such an instant message application), voice, image, or video inputs or outputs. Digital assistants use natural language processing (NLP) to match user inputs to user intents. Many digital assistants use artificial intelligence techniques, including machine learning, to improve the matching performance. Digital assistants are typically activated using a wake word (e.g., "Alexa" for Amazon Alexa or "OK Google" for Google Assistant).

An intelligent digital character as interface of the portable computing and communication device invention also referred to as a virtual digital character, human or humanoid moving image, the interactive digital character, A.I. robotic interface, is a software agent with audio-visual animated human like movement that interacts with the user, and has a selectable personality that performs tasks for a user and performs device control.

Organizations may employ or support any number of a broad range of back-end systems to assist in management of their operations. Such systems may include one or more analytics systems (e.g., Splunk or Tableau systems), data or database systems (e.g., Hadoop, MongoDB, or MySQL systems), procurement, sourcing, ERP, spend, supplies, and logistics systems (e.g., Coupa, SAP, Ariba, Oracle, Opera, iValua, or Workday systems), operations systems (e.g., Spiceworks, Solarwinds Orion, HP OpenView/Helion Suit, IBM Cloud Orchestrator, or OEM 13c systems), public cloud systems (e.g., AWS, Azure, Google, Oracle, or SFDC systems), cloud services (e.g., Ravello), cloud access security broker (CASB) systems (e.g., SkyHigh Networks, Netskope, Elastica (Symantec/BlueCoat), or CloudLock (Cisco) systems), document editing and signing systems (e.g., Office 365, Google Docs, Adobe Sign, or Docusign systems), storage systems (e.g., Box, DropBox, OneDrive, Google Drive, Sharepoint, or iCloud systems), helpdesk integration systems (e.g., ZenDesk, ServiceNow, JIRA, or other XML/API systems), audio/video systems (e.g., Twilio, H.323, or SIP Integration systems), product pricing systems (e.g., Tech Data/Avnet, Arrow, Westcon, or Ingram systems), service pricing systems (e.g., system integrator systems (e.g., Dimension Data, Presidio, WWT, ePlus, NTT Data, Wipro, or Infosys systems), service provider systems (e.g., XO, AT&T, Verizon, Tata Communications, CenturyLink, or Zayo systems), freelance systems (e.g., Upwork, Adecco, eLance systems), or financing systems (e.g., XfinAM or Capital Pines systems), co-location systems (e.g., Equinix, DRT, RagingWire, CenturyLink/Level3, BT, AT&T, or SingTel systems)).

Organizations may also employ or support any number of a broad range of operating systems or platforms, including web platforms (e.g., Chrome, Firefox, Opera, Microsoft Edge, or Microsoft Internet Explorer), desktop application platforms (e.g., Mac or Windows), tablet or mobile platforms (e.g., Web, iOS, Android), low-tech platforms (e.g., email, instant messaging, Slack, or Microsoft Teams), or augmented reality platforms (e.g., Microsoft Hololens).

"CLIENT DEVICE" in this context refers to any machine that interfaces to a communications network to obtain resources from one or more server systems or other client devices. A client device may be, but is not limited to, a mobile phone, laptop, portable digital assistants (PDAs), smart phones, tablets, laptops, or any other communication device that a user may use to access a network.

"NETWORK COMMUNICATIONS SYSTEM" in this context refers to one or more systems that receives or sends data over a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other type of cellular or wireless coupling. In this example, the wireless coupling may implement any of a variety of types of data transfer technology, such as Single Carrier Radio Transmission Technology (1xRTT), Evolution-Data Optimized (EVDO) technology. General Packet Radio Service (GPRS) technology. Enhanced Data rates for GSM Evolution (EDGE) technology, third Generation Partnership Project (3GPP) including 3G, fourth generation wireless (4G) networks, fifth generation wireless (5G) networks, and other future generation networks. The network communications system can use Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long-range protocols, or other data transfer technology.

"COMPONENT" in this context refers to a device, physical entity or logic having boundaries defined by function or subroutine calls, branch points, application program interfaces (APIs), or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a Field-Programmable Gate Array (FPGA) or an Application Specific Integrated Circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated if the decision to implement a hardware component mechanically, in dedicated and permanently configured circuitry, or in temporarily configured circuitry (e.g., configured by software) may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, when a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein. "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)). The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

"PROCESSING UNIT" in this context refers to any circuit or virtual circuit (a physical circuit emulated by logic executing on an actual processor) that manipulates data values according to control signals (e.g., "commands", "op codes", "machine code", etc.) and which produces corresponding output signals that are applied to operate a machine. A processor may, for example, be a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC) or any combination thereof. A processor may further be a multi-core processor having two or more independent processors (sometimes referred to as "cores") that may execute instructions contemporaneously.

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright 2021, Frank Holling. All Rights Reserved.

The description that follows may include systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

The drawings illustrate generally, by way of example, but not by way of limitation, various embodiments discussed in the present document. In order to more easily identify the discussion of any particular element or act, the most significant digit or digits in a reference number refer to the figure number in which that element is first introduced.

Further, a person skilled in the art will appreciate that elements in the drawings are illustrated for simplicity and may not have necessarily been drawn to scale. In terms of the construction of the device, one or more components of the device may have been represented in the drawings by conventional symbols, or images of the characters showed on the screen that are not originally designed but used to give a correct impression of the working of the invented device. The drawings may show only those specific details that are pertinent to understanding the embodiments of the present disclosed system so as not to obscure the drawings with details that will be readily apparent to those of ordinary skill in the art having benefit of the description herein.

For the purpose of promoting and understanding of the principles of the disclosed system, reference will now be made to the embodiment illustrated in the drawings and specific language will be used to describe the same. It will nevertheless be understood that no limitation of the scope of the disclosed system is thereby intended, such alterations and further modifications in the illustrated system, and such further applications of the principles of the disclosed system as illustrated therein being contemplated as would normally occur to one skilled in the art to which the disclosed system relates.

It will be understood by those skilled in the art that the foregoing general description and the following detailed description are exemplary and explanatory of the disclosed system and are not intended to be restrictive thereof.

Figure 13:
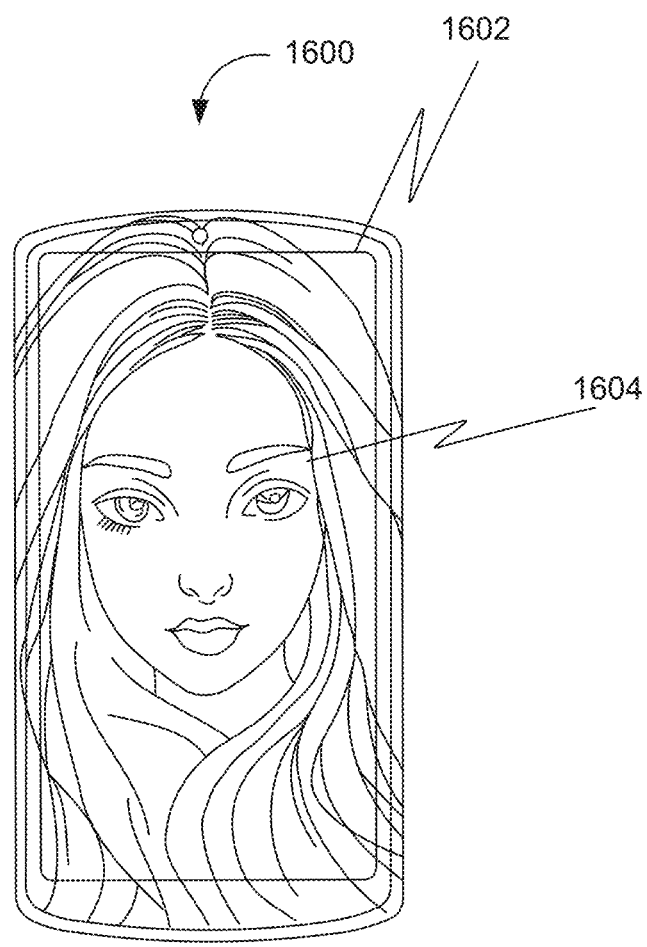
FIG. 13 illustrates the disclosed system 1600 comprising an all-around screen, presenting a human or humanoid or other character image representations of the two- or three-dimensional models on a front side screen, in accordance with some embodiments.

FIG. 13 illustrates a disclosed system 1600 comprising an all-around screen, presenting a human 1604 or humanoid or other character image representations of the two- or three-dimensional models on a front side screen, wherein a human 1604 or humanoid or other character image representations of the two- or three-dimensional models is available to the user selected from a group of available human or humanoid or other character image, according to some embodiments. One of these available humans or humanoid or other character image representations of the two- or three-dimensional model is used as the three-dimensional representation of the intelligent digital character selectable by the user. For example, any of the multiple choices of human or humanoid or other character image representations of the two- or three-dimensional models. This is similar to user interface themes, or characters in a role-playing game. In some embodiments, the human or humanoid or other character image representations of the two- or three-dimensional model representing the intelligent digital character is the representation of a woman or a female who can play the role of a girlfriend, or is the representation of a man or a male who can play the role of a boyfriend, or is the representation of a virtual or electronic cyber entity who can play the role of a Sci-Fi friend, or is the representation of a robotic entity who can play the role of a robot friend, or is the representation of a female fantasy person who can play the role of a fairy friend, or any combination thereof. These are sample of some of the different artificially intelligent characters or personalities to choose from. The image representation of the characters only appears when the device is turned on as the default or preferred user interface of the device, while showing only blank or dark or turned off screen before the device is started or the screen is turned on. The image representation of the characters appears as the device interface and as a socializing friend when the device is turned, while showing only blank or dark or turned off screen before the device is started or the screen is turned on. The human 1604 or humanoid or other character image representations of the two- or three-dimensional model also have corresponding artificial intelligent characters or personalities represented by the animation or movement of the images or models and the context sensitive text or audio or both text and audio output generated mimicking conversation with the user or users. Further the figure shows an all-around screen from front side of the disclosed system 1600 that displays a human 1604 or humanoid like moving image or moving two- or three-dimensional model representation of the intelligent digital character on front sides of the device, according to some example embodiments. The front side 1602 of the disclosed system 1600 shows the front facing part of the human 1604 or humanoid like moving image or moving two- or three-dimensional digital character model. The digital character is for the largest part visible at the front of the device through the main touchscreen in the middle.

In one embodiment, a visual animated and speaking intelligent digital character as interface of the portable phone device, or the computing and communication device, that may perform given tasks to operate the phone device. A humanoid or human-like visually animated and speaking character as the interface of a phone device, or portable computing and communication device, performs given tasks to operate the portable phone device, or the computing and communication device. A visible and speaking digital A.I. robotic presentation as the interface of the portable phone device, or the computing and communication device, that may perform given tasks to operate the phone device. A visible and speaking intelligent digital character as the interface of the portable phone device, or the computing and communication device, that may perform given tasks to operate the device. A visual and speaking intelligent digital character as interface, or speaking and visual animated digital assistant, of the portable phone device, or the computing and communication device, is made visible on an all-around screen that covers the front, back, and all sides of the device, and seen from all sides through a transparent case, giving an impression as if the speaking and moving intelligent digital character is present inside the device, making the portable phone or the computing and communication device come alive with a robotic personality interface. The visible and speaking intelligent digital character on the screen of the portable phone or the computing and communication device, communicates, and interacts visually, with movement and with voice or sound, socializing and performing social role play in a human-like way with the user. It is possible to choose different style characters of the visible and speaking intelligent digital character on a screen as interface of the portable phone or the computing and communication device.

Figure 14:
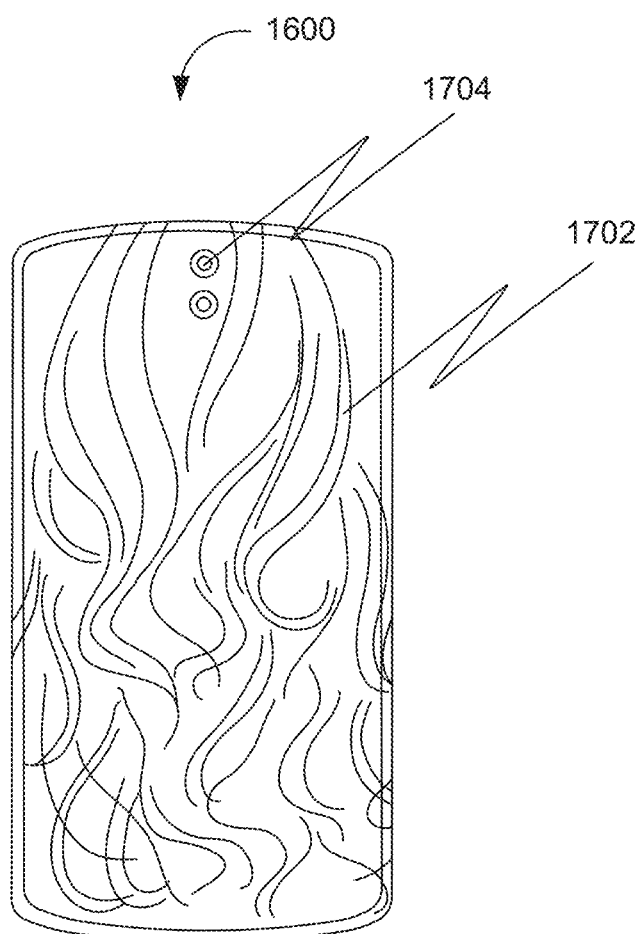
FIG. 14 illustrates an all-around screen of the disclosed system 1600 from backside that displays a human or humanoid like moving image or moving two or three-dimensional model, in accordance with some embodiments.

FIG. 14 illustrates an all-around screen of the disclosed system 1600 from backside that displays a human or humanoid like moving image or moving two- or three-dimensional model representation of the intelligent digital character on all sides of the device, according to some embodiments. The back side 1702 shows the back facing part of the digital character. The digital character is for the largest part visible at the front of the device through the main touchscreen in the middle. At the front of the device the curved all-around screen enables showing more of the intelligent digital character until the rounded edges of the device. When the device is turned all sides of the digital character are visible and not just the front and the back, according to some example embodiment. Curved screen at the top or at the bottom or both at the top and the bottom enables showing the human or humanoid like moving image representation of the intelligent digital character from the top or the bottom or the top and the bottom. In some example embodiment, the human or humanoid like moving image representation of the intelligent digital character is seen from all sides, the front, the back, the left, the right, the top and the bottom.

In some embodiments, the disclosed system 1600 comprises main touch screen, and the all-around screen covering the front, the rounded edges, and the back to view a human or humanoid like moving image or moving two- or three-dimensional model representation of the intelligent digital character from all sides giving the impression the digital character is present inside the phone.

In some embodiments, the disclosed system or portable phone device 1600, or the computing and communication device does not have a normal phone case but uses an all-around image screen behind a transparent glass or plastic case, to create images or moving images on all sides of the device. The new design feature of an all-around screen is made with a one-piece foldable non-touch screen wrapped around the device to cover the front side and back side and all corners and rounded edges, held in place by two half transparent glass or plastic rounded edge case pieces that are put together, and an inner device frame. A second option to create a new design feature is to use two rounded edge non-touch screens for front and back side of the device put together to form a total screen from back to front, protected by two half transparent glass or plastic rounded edge case pieces that fit around the two rounded screens that are put together. Any other screen technology not mentioned above but is possible to us to make an all-around image screen on a phone or portable computing and communication device with the purpose to create images or moving images on all sides of the device and/or creates a 360-degree view, may also be used.

In some embodiments, the human 1604 or humanoid like moving image representation of the intelligent digital character performs tasks based on voice command input where the task operation is shown on a presented menu display with the visual representation of the intelligent digital character in the background.

In some embodiments, the human 1604 or humanoid like moving image representation of the intelligent digital character mimicking natural movement and behavior of a human such that front side of the human or humanoid like image or model from showing the face at the front part of the device 1602 to turning the face to the back part 1702 of the device, based on device placement change or change in the relative position of a user and the device. In some example embodiments, the default or custom mode of operation is to face the user and typically the user facing the front part of the device 1602 sees the front side of the image representation of the intelligent digital character. If the user flips around the computing device with the back of the device to face the user (204) the intelligent digital character may turn together with the device. But may turn after some moments back around to the back side of the device to face the user again, the image representation of the intelligent digital character moves mimicking natural movement and human like behavior by turning the front side of the intelligent digital character from the front of the device 1602 to the back of the device 1702 to face the user again. The image representation of the intelligent digital character moves mimicking natural human behavior of keep looking the user in the eyes. The front side and the back side of the human or humanoid digital character model are just two sides of a three-dimensional model, and inside the central processing units or other processing units, whether CPU, GPU, optical processor, quantum processor, or other computing units, the computing device rotates this internal three-dimensional model. During the turning of the device all sides of the three-dimensional digital character are visible on the all-around screen. During the turning of the animated digital character all sides of the three-dimensional digital character may turn and glide momentarily visible over the back side of the device.

In some example embodiment, the intelligent digital character may also perform natural language or natural language converted to sound-based interactions with the user in human like conversation. The intelligent digital character may say hi or hello to the user, in any manner or any language. For example, "Hi, how are you today?" When the user flips the device and the intelligent digital character is facing the opposite direction, natural language output is a context and situation dependent phrase in any style or any language. For example, "Hey, where are you?" Once the human or humanoid like image turns around to the backside of the device to face the user, an example natural language output is "Oh, there you are!" The intelligent digital character may optionally add more personal touch in the natural language output after the above-mentioned example natural language output, for example "You like my backside?" These example conversation phrases may be quite different based on the context, the situation, or the language. The natural language output is either text or text converted to sound output or a combination of both or output in any other representation. The intelligent digital character may naturally socialize with the user with charm, fun or humor.

In some embodiments, the disclosed system 1600 may perform tasks based on voice command input where the task performance is shown on a presented menu display with the visual representation of the intelligent digital character in the background. Tasks performed include performing text, document, image, or other file related operations, opening or closing applications, performing a task with an application, making phone calls, reading or sending text messages or emails, searching, web browsing, screening icons, menu, windows, dialog boxes, hyperlinks, or any other well-established input widgets for inputs, showing status and/or settings, or any other tasks that is performed by or on a computing device. Upon completion of the task or upon voice or touch or other input from the user, the visual representation of the tasks is removed, and the visual representation of the intelligent digital character is moved to the foreground from the background. Besides voice or touch input, other inputs include, but are not limited to, Bluetooth devices, Virtual Reality devices, mouse, keyboard, trackball, wearable devices, or any other computing input technologies. The visible and speaking intelligent digital character on a screen that is the user interface of the portable phone or the computing and communication device, presents a menu display that shows the progress of given tasks by speech or gesture of the user. The presented menu display also enables the user to manually control the portable phone or the computing and communication device by touching the icons on the presented menu display if needed.

In some embodiments, the disclosed system 1600 may comprise a touch screen input system on the presented menu display, where user may enter inputs touching the presented menu display, with the visual representation of the intelligent digital character in the background. The visual inputs tools, including but not limiting to icons, menu, windows, dialog boxes, hyperlinks, or any other well-established input widgets appear on top of the visual representation of the intelligent digital character in the background, as result of tasks performed based on voice command input.

In some embodiments, the disclosed system 1600 comprises a normal mode, wherein the digital character is presented on all display regions of the device. Further, the disclosed system 1600 comprises a private mode wherein the digital character is only visible on the front main touch screen. This makes the all-around screen available to show images representing selectable case designs variations. In some example embodiments, the default or custom settings is to show the front or facial side of the humanoid or character in the front part of the screen. In some example embodiments, the front part of the screen shows a border around the humanoid or character moving image using images representing case designs to hide the humanoid or digital character model of the digital assistant or the virtual assistant from the curved or rounded edges of the front part of the screen shows the device in normal mode with back screen showing the back side of the digital character. The device in private mode hides the human or humanoid model of the digital assistant or the virtual assistant from the back side and curved or rounded edges at the front part of the all-around screen and keeps the digital character only visible on the main touch screen. In private mode, the all-around screen case may show non-moving images that represent device cover case designs to personalize the device design style.

Figure 15:
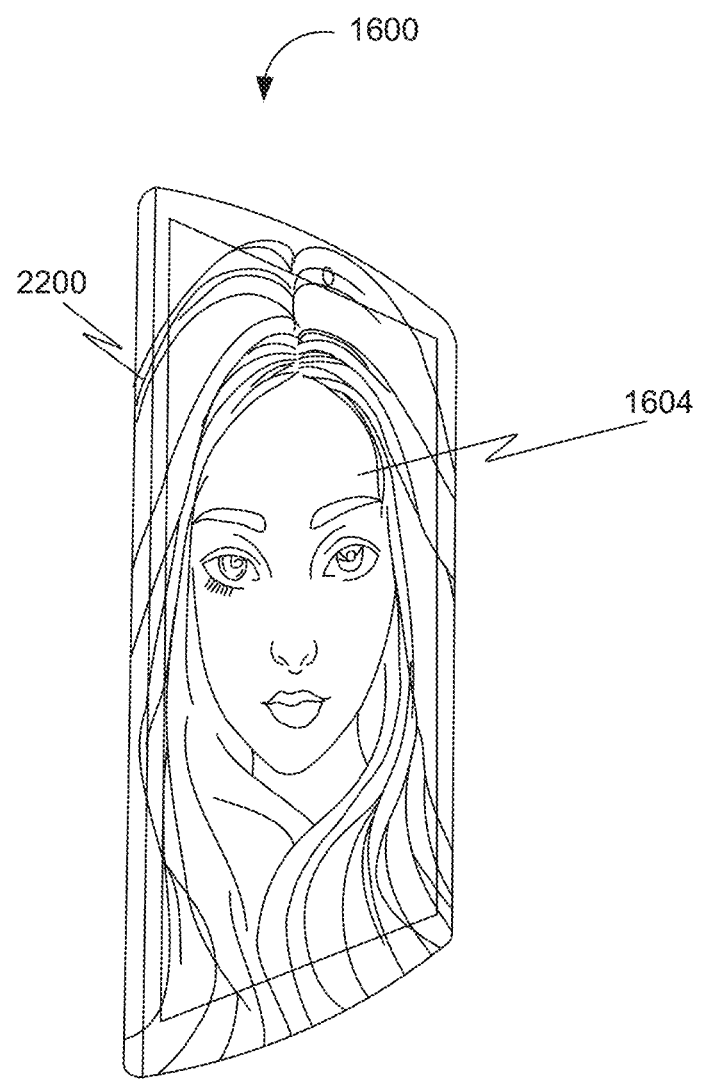
FIG. 15 illustrates a side view of the disclosed system 1600 comprising an all-around screen presenting a human or humanoid or other character image representations of the two- or three-dimensional models, in accordance with some embodiments.

FIG. 15 illustrates a side view of the disclosed system 1600 comprising an all-around screen presenting a human or humanoid or other character image representations of the two- or three-dimensional models, in accordance with some embodiments.

Accordingly, FIG. 15 illustrates the side view of the disclosed system 1600, wherein the intelligent digital character 1806 image moves mimicking natural body rotation of a human or the movement of the disclosed system 1600 such that front side of the human or humanoid like image turns around from showing the face at the front part of the all-around screen to showing the face at the back part of the all-around screen, or turns back from showing the face at the back part of the all-around screen to showing the face at the front part of the all-around screen to always keep facing the user. The side display 2200 is configured to display the side image of the intelligent digital character 1604 based on the relative position of the user and the disclosed system 1600, wherein the side display 2200 is further configured to show the movement of the digital character from the front display 1602 to the back display 1702 mimicking the movement of one or more of a human and a humanoid based on the relative movement of the user and the disclosed system 1600.

Figure 16:
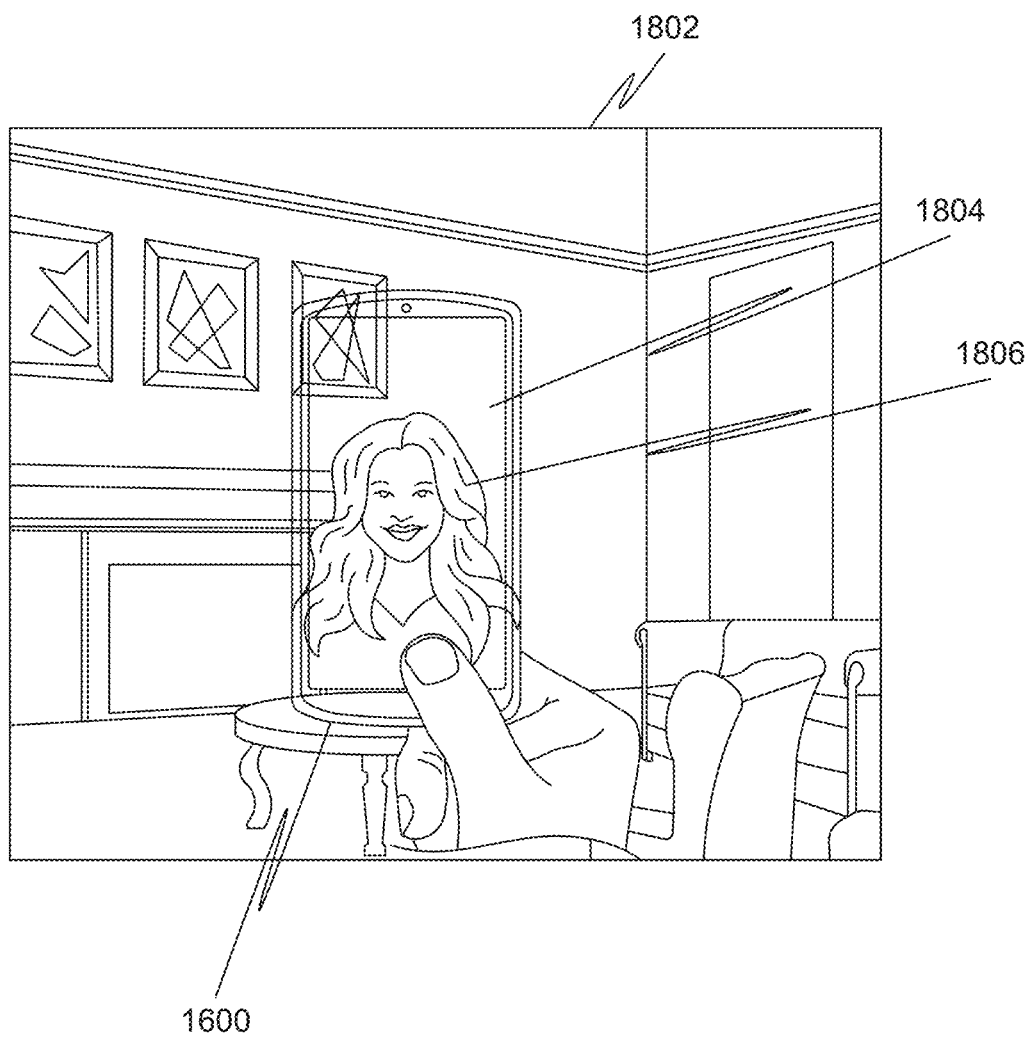
FIG. 16 illustrates the disclosed system 1600 comprising an all-around screen, presenting a human or humanoid or other character image representations of the two- or three-dimensional models, in accordance with some embodiments.

FIG. 16 illustrates backgrounds or surroundings 1802, where a part of the background or surrounding 1802 is blocked by the device 1600 from the perspective of the user, but that part of backgrounds or surroundings 1802 are captured by the camera 1704 at the back side of the device and are screened on the front part 1602 of the all-around screen and the main touch screen, with the two- or three-dimensional representation of the intelligent digital character 1806 super imposed on top of the screened background 1804. Showing the same background captured by the backside camera 1704 of the device projected in the front part of the screen 1602 which provides an uninterrupted view of the visible background of the location into the background visible on the device. Showing the two- or three-dimensional representation of the intelligent digital character 1806 on top of the background or surrounding 1802, makes the intelligent digital character 1806 to be present in the real world surrounding giving a feel of virtual reality. In private socializing mode with the intelligent digital character 1806, the back part of the device does not show the back side of the intelligent digital character, but instead shows a static image representing the device casing design, which can optionally be chosen by the user. Zooming and scaling of the background image captured by the camera or cameras (both the back and the front cameras, or alternatively many other cameras), is calculated and performed based on the angle of view of the human eye and the calculated distance of the user or the users from the device based on camera or other sensors to detect the distance of the user or the users. The figure shows an option in private mode. It uses the front part of the all-around screen that is only visible for the user. The option lets the backside camera capture moving images in the same angle of view as the user and use these captured moving images as the background behind the two- or three-dimensional representation of the intelligent digital character on the front part of the all-around screen and main front touch screen. The projected background matches the obscured parts by the device of the real location from the perspective of the user and through the all-around screen of the device creates a seamless effect as if the digital character is in the same environment as the user, in accordance with some embodiments.

In some embodiments, the disclosed system 1600 may be in a private mode with optional case styles and appearance on the backside of the device, the front rounded screen part and main front touch screen showing the chosen digital friend character, in the same environment as the user. The possibility is created by using the back camera view in the same angle as the human eye and use the captured image as the background for the digital friend character, giving an impression as if the digital friend character is together with the user in the same environment.

In some embodiments, the backside camera 1704 of the device 1600 captures a live moving image of the location where the user is in, while the user holds the phone in front of the face and the device uses the live captured moving image as the background of the visual and speaking intelligent digital character, or the humanoid or human-like visually animated and speaking character, or the visible and speaking digital A.I. robotic presentation, or the visible and speaking intelligent digital animated character. Creating an effect as if the character is in the same location as the user. A virtually reality illusion made by the all-around screen that creates a seamless visual effect together with the real location.

In some embodiments, the device 1600 may comprise multiple choices of customization of human or humanoid or other character image representations of the two- or three-dimensional intelligent digital character models by changing any clothes, body parts, hair color and/or style, color, or other attributes, including different moods or emotions associated with the customized variation of the two- or three-dimensional representation of the intelligent digital character. Any one of the available humans or humanoids or other character image representations of the two- or three-dimensional model (805) representing the two- or three-dimensional representation of the intelligent digital character out of the available multiple choices of human or humanoid or other character image representations of the two- or three-dimensional models are customizable. Additional images or three-dimensional models representing accessories are downloadable separately or downloaded or available as part of a two- or three-dimensional representation of the intelligent digital character. Any of these accessories is chosen and applied to the two- or three-dimensional representation of the intelligent digital character to give a particular look or change the look. The motions or animations of these accessories together with the motions or animations of the two- or three-dimensional representation of the intelligent digital character are generated using 3D graphics processing, model rendering, model movements, and other well-established graphics technologies. In some example embodiments, the images and models of a representation of the intelligent digital character has multiple variants representing some variations of the two- or three-dimensional representation of the same showing different looks or personalities of the two- or three-dimensional representation of the intelligent digital character. Variations of the movements or animations the two- or three-dimensional representation represents different moods or personalities including, happy, sad, concerned, carefree, or any other moods. These representations of the emotions and moods from different variations of the two- or three-dimensional representation are context sensitive and dependent on the interaction with the user or the context. This context sensitive motions or animations are generated using 3D graphics processing, model rendering, model movements, and other well-established graphics technologies and knowledge base, pattern recognition, deep learning, and other well established artificial intelligence technologies. In some example embodiments, text or audio or text and audio are generated as output together with the context sensitive motions or animations. The text or audio is also context sensitive using natural language processing, knowledge base, pattern recognition, deep learning, and other well established artificial intelligence technologies. In some example embodiment, it is possible to change the details in appearance, and behavior of the visible and speaking intelligent digital character on the screen as the interface of the portable phone or the computing and communication device.

In some embodiments, the human or humanoid moving image representation of the intelligent digital character uses downloaded additional images or models over network communication systems to generate images to be used for advertisement holding a bottle of an advertised drink or holding a poster or trailer of an advertised movie.

In some embodiments, the human or humanoid moving image representation of the intelligent digital character screens images or models of a bottle of an advertised drink held in hand or placed in other places or animated to mimic drinking from the bottle, and optionally may also generate text or audio output regarding the advertised bottle of drink to initiate an artificially intelligent conversation with the user that may entice the user to buy the bottle of drink, for example, "Let's have a drink". In some embodiments, the human or humanoid moving image representation of the intelligent digital character screens images or models of a poster or a trailer of an advertised movie held in hand or placed in other places or animated to mimic watching the poster or the trailer, and optionally may also generate text or audio output regarding the advertised movie to initiate an artificially intelligent conversation with the user that may entice the user to watch the movie, for example, "Here is a new movie. Let's watch the trailer together," or "Here is an interesting movie available to buy or rent. Let's watch it together." These two sample embodiments are two indicative examples, but similar advertisements using images or models of products or services with animation or gestures or optionally text or audio or text and audio output to perform artificially intelligent conversation by the digital assistant or the virtual assistant is performed in other embodiments not shown in the figures. The type of advertisement screened by the intelligent digital character is dependent on the chosen avatar or theme of the intelligent digital character or is independent. For example, a girlfriend themed intelligent digital character may show personal or entertainment related advertisements, whereas a robotic themed intelligent digital character may show more technology related advertisements, and alternatively the intelligent digital character may show any advertisements irrespective of the theme. The advertisements may also be targeted based on the data mined from historical or/and recent data of the artificially intelligent video and audio interaction with the user.

In some embodiments, the possibility to create 'product placement advertising' as it is called in the movie industry where movie scenes show brand products. The disclosed system 1600, or the portable computing and communication device invention may perform a profit generating style of advertising directly in the speaking visual character interface of the device. In role play socializing interactions with the device user, the visible and speaking intelligent digital character, or the humanoid or human-like visually animated and speaking character, or the visible and speaking digital A.I. robotic presentation, or the visible and speaking intelligent digital animated character, may show or hold products in the hand, and optionally promote the product with the spoken sounds in a way that fits the role play situation and the personality of the visible and speaking intelligent digital character.

In some embodiments, the invented phone or computing device may comprise 2 rounded non touch screens for front part and a back part of the device, with operating hardware or electronics between the front part and the back part of the screens.

In some embodiments, front part of the screen is covered with a transparent half case with an open space for the main touch screen and curved edges, and the back part of the screen is covered with a transparent closed case with curved edges, with the two transparent cases connected together at the edges to form a transparent cover around the all-around screen comprised of the front part and the back part. The transparent case is made of any transparent material, including but not limited to glass or plastic, and may provide different functionalities, including but not limited to toughness, scratch resistance, water spill resistance, etc. Most current devices use tempered glass, such as Corning's Gorilla glass, to produce such device casing. However, tempered glass or any other alternative materials is used in some embodiments.

In some embodiments, the main touch screen part at the front is surrounded by rounded edge or curved edge half front non touch screen, and the back part of the screen is a full covering non touch screen with rounded edge or curved edge, with the curved edge half front screen and the curved edge half back screen are connected together to form a whole all-around non touch screen that covers the internal electronics and other internal parts of the device completely from front to back, top to bottom and around the sides. The main touch screen part of the front has a little better quality or a different quality with better contrast to create a kind of a clear window for the intelligent digital character for the front central part. The 2 curved edge half screens have a quality with lower contrast, and when seen through the transparent casing this creates the illusion that the character is behind the transparent case and present in the device.

Figure 17:
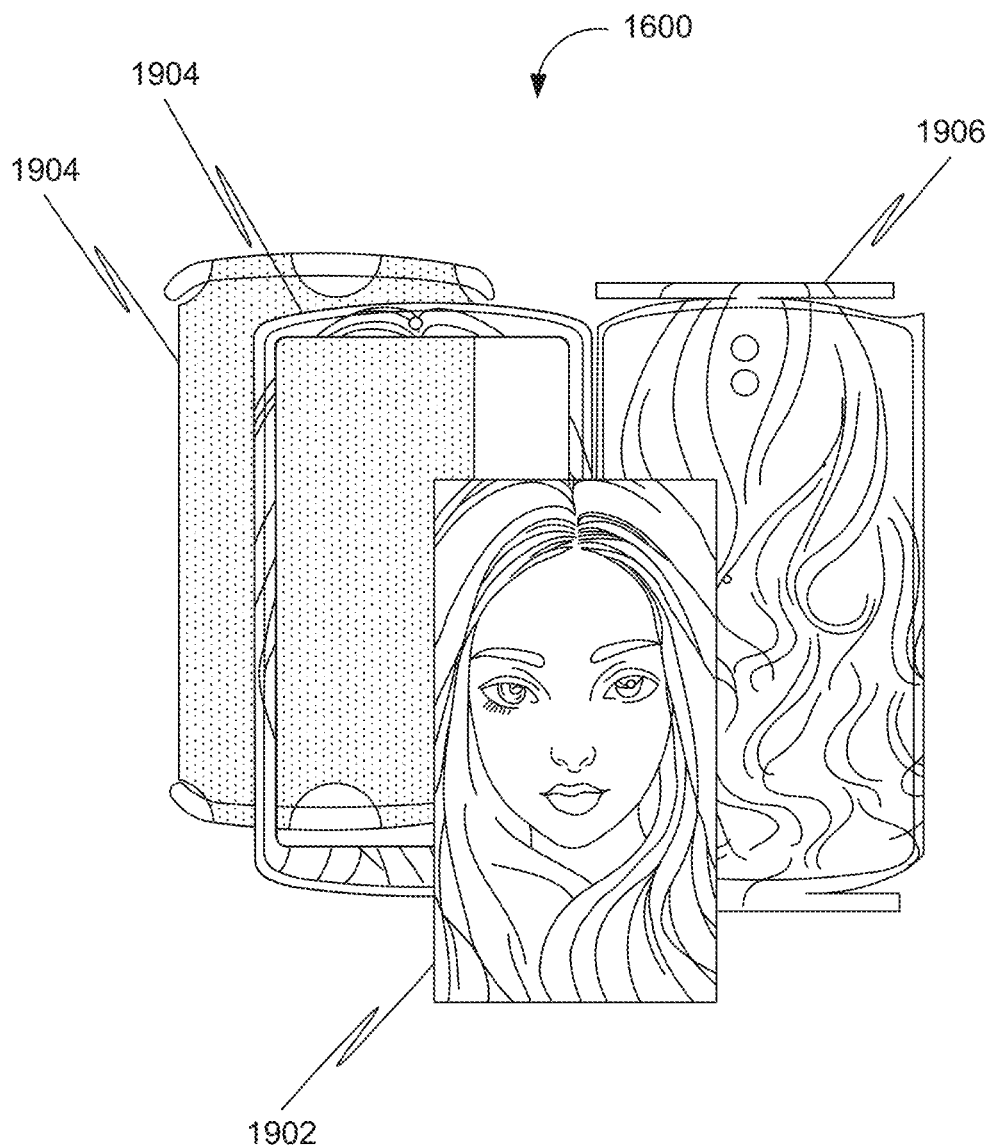
FIG. 17 illustrates a disassembled view of the disclosed system 1600 comprising multiple straight or rounded screens for a front part and a back part to form the all-around case screen, in accordance with some embodiments.

FIG. 17 illustrates a disassembled view of the disclosed system 1600 comprising multiple straight or rounded screens for a front part and a back part to form the all-around case screen. A foldable screen may curl around all rounded edges to cover the complete transparent case 1904 of the phone or computing device. The main front touch screen 1902 fits in the square cut space of the foldable screen to form one seamless image. Two transparent half case parts 1904 for back and front that may fit together, hold the foldable screen in place with extra help of an inner frame. The main touch screen part of the front has a little better quality or a different quality with better contrast to create a kind of a clear window for the intelligent digital character for the front central part. The non-touch foldable screen 1906 has a quality with lower contrast, and when seen through the transparent casing this creates the illusion that the character is behind the transparent case and present in the device.

In some embodiments, the disclosed system 1600 and the portable computing and communication device 1600 comprises all-around screen covering the front and the back and with curved or rounded edges covering both the sides, but optionally not the top and the bottom edges of the device. The bottom edges of the computing device not covered by the curved or rounded edge of the screen provides input or output ports or means, including by not limited to power input, speaker, microphone, sensors, flash, camera, buttons, stylus, storage, cards, and other input or output hardware.

In some embodiments, the starting of the phone or computing device wherein the two- or three-dimensional representation of the intelligent digital character appears immediately after the starting and is the principal user interface of the device. Prior to the starting, the computing device appears as a generic or usual handheld device or phone or smartphone or other usual computing devices, among other appearances, but after the starting of the computing device the front and the back part of the screens, along with the curved or rounded edges, show the two- or three-dimensional representation of the intelligent digital character and immerse the user in a virtual reality experience. In some embodiments, starting of the computing device is performed touching the touchscreen, and optionally providing biometric authentication through the touchscreen, among other means of starting the device, including but not limited to pressing a button or buttons.

In some embodiments, the front side of the disclosed system 1600, or the portable computing and communication device invention, is a cut out space at the front side of the non-touch sensitive all-around image screen to fit a conventional flat rectangular touch sensitive screen as the main front screen of the device. This designed screen composition enables a 360-degree view of presented images, while the device may be held in the hand for usage, with touch operations also available at the conventional flat rectangular front screen part.

Figure 18:
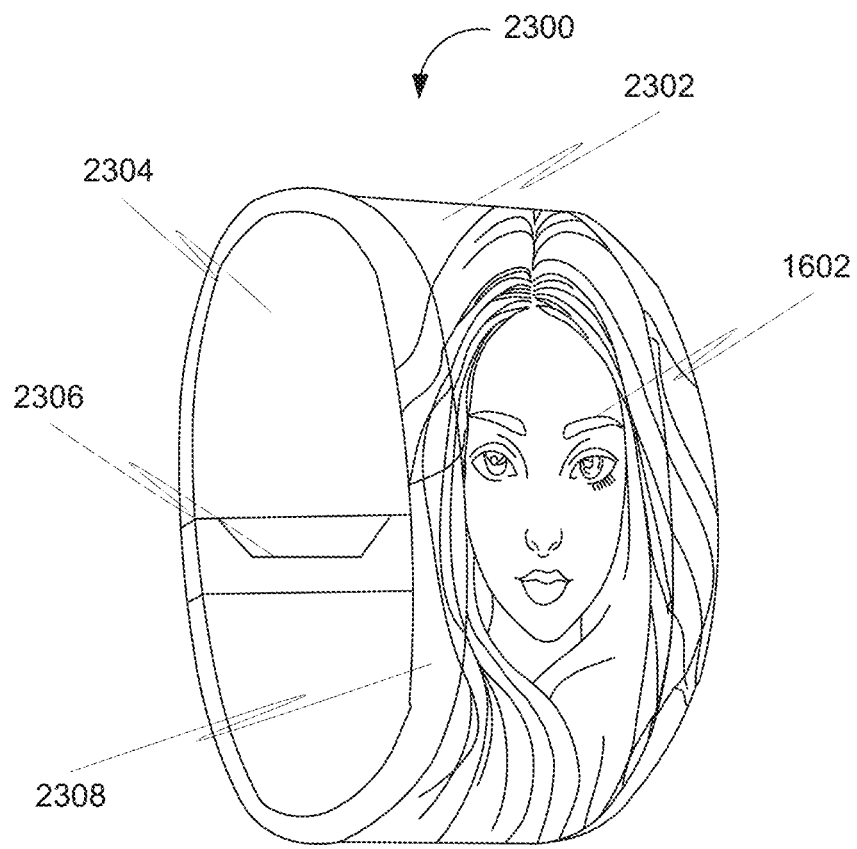
FIG. 18 illustrates a wearable device 1800 comprising a screen, presenting a human or humanoid or other character image representations of the two- or three-dimensional models, in accordance with some embodiments.

FIG. 18 illustrates a wearable device 2300 comprising a screen, presenting a human or humanoid or other character image representations of the two- or three-dimensional models, in accordance with some embodiments.

Accordingly, the wearable device 2300 comprises an all-around screen 2302 configured to display the intelligent digital character 1604. The all-around screen 2302 of the wearable device 2300 is enclosed within a transparent casing 2308. The wearable device 2300 further comprises a wrist strap 2304 and a locking mechanism 2306, wherein the user wears the wearable device 2300 using the wrist strap 2304 and the locking mechanism 2306. The all-around screen 2302 is further configured to update the plurality of display region based the movement of the intelligent digital character 1604.

Figure 19:
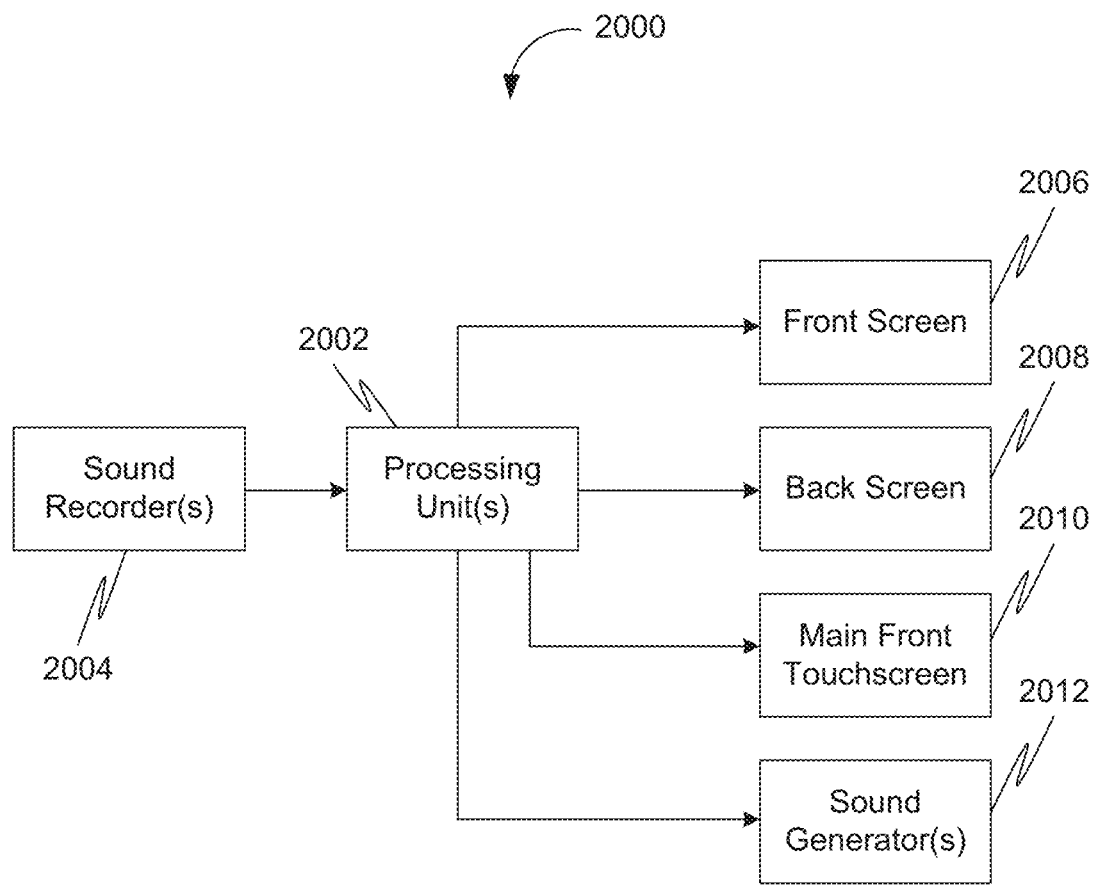
FIG. 19 illustrates a computing system 2000 implementing the interactive digital friend character with moving three-dimensional human or humanoid representation, in accordance with some embodiments.

FIG. 19 illustrates a computing system 2000 with processing units 2002 implementing the intelligent digital character with moving three-dimensional human or humanoid representation having at least an all-around non touch screen showing both front and back side of the moving images on front screen 2006 and back screen 2008, and a main touch screen 2010, a sound generator 2012 and a sound recorder 2004, in accordance with some embodiments.

Figure 20:
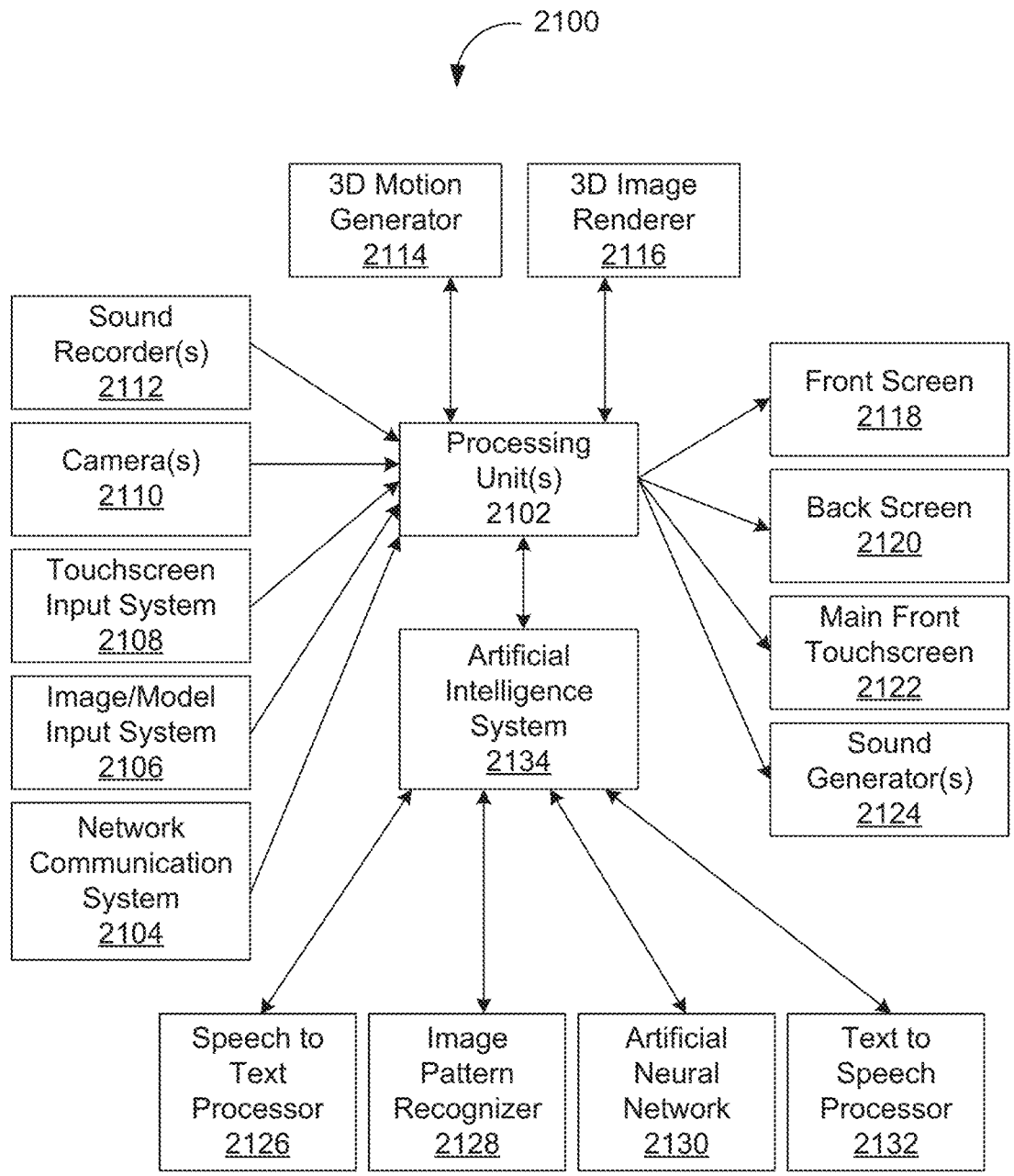
FIG. 20 illustrates a computing system 2100 implementing the interactive intelligent digital character with moving three-dimensional human or humanoid representation, in accordance with some embodiments.

FIG. 20 illustrates a computing system 2100 with processing units 2102 implementing the interactive intelligent digital character with moving three-dimensional human or humanoid representation having sound recorder 2112, camera 2110, touchscreen input system 2108, image/model input system or uploader 2106, and network communication input system 2104, processing units 2102 implementing three-dimensional (3D) motion generator 2114, 3D image renderer 2116, artificial intelligence systems 2134 comprising speech-to-text processor 2126, image pattern recognizer 2128, artificial neural network 2130, text-to-speech processor 2132, and screen with front part 2118, back part 2120, main front touch screen 2122 and sound generator outputs 2124.

Figure 11:
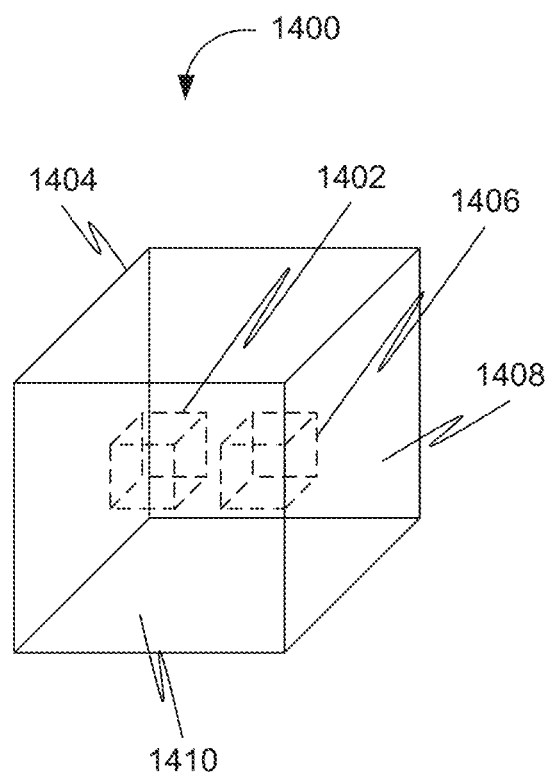
FIG. 11 illustrates a cubical device 1400 for facilitating presentation of an object, in accordance with some embodiments.

FIG. 11 illustrates a cubical device 1400 for facilitating presentation of an object, in accordance with some embodiments.

Accordingly, the cubical device 1400 comprises a processing device 1402, a power source 1406, and a display device 1404. Further, the display device 1404 comprises a plurality of display sides, wherein multiple display screens are affixed to each other in shape of a cube. Further, the processing device 1402 is configured to execute an instruction associated with presentation of a plurality of views of an object on the plurality of display sides. Further, the plurality of display side comprises a first display side 1408 is configured to display a first view of the object and a second display side 1410 is configured to display a second view of the object. Further, the power source 1406 is configured to supply power to the processing device 1402, and the display device 1404.

Figure 12:
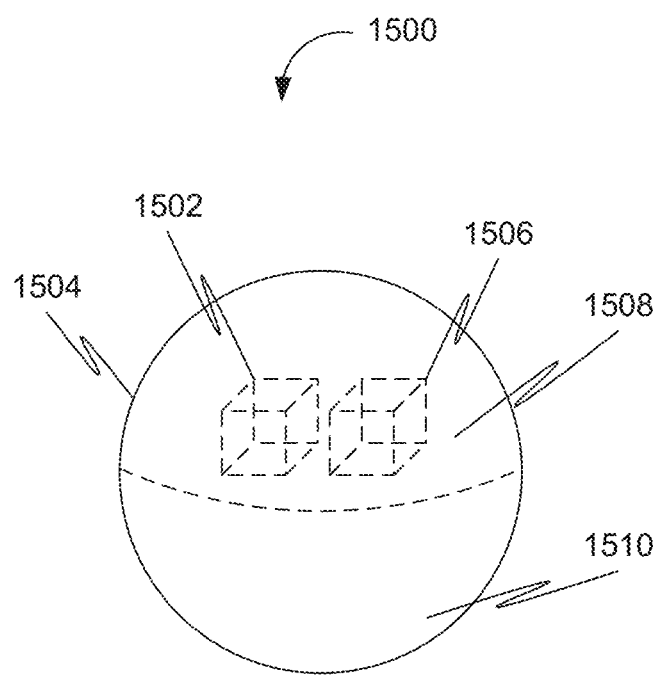
FIG. 12 illustrates a spherical device 1500 for facilitating presentation of an object, in accordance with some embodiments.

FIG. 12 illustrates a spherical device 1500 for facilitating presentation of an object, in accordance with some embodiments.

Accordingly, the spherical device 1500 comprises a processing device 1502, a power source 1508 and a flexible display device 1504 in a shape of a sphere. Further, the processing device 1502 is configured to execute an instruction associated with presentation of a plurality of views of an object on the flexible display device 1504. Further, the flexible display device 1504 comprises a plurality of display regions. Further, the plurality of display regions comprises a first display region 1508 configured to display a first view of the user and a second display region 1510 configured to display a second view of the object. Further, the power source 1506 is configured to supply power to the processing device 1502, and the display device 1504.

The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. The scope of embodiments is by no means limited by these specific examples. Numerous variations, whether explicitly given in the specification or not, such as differences in structure, dimension, and use of material, are possible. The scope of embodiments is at least as broad as given by the following claims.

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component of any or all the claims.

A computer-implemented system and method of operating a digital character interface on a computing device having at least an all-around screen, and optionally a sound generator and a sound recorder. The computing device shows the intelligent digital character in a human or humanoid like moving image, showing both the front and the back side of the human or humanoid like digital character on the front, the back and the rounded edge part of the all-around screen. The human or humanoid like digital character's image moves mimicking natural body rotation of a human such that front side of the human or humanoid like image turns around from showing the face at the front part of the all-around screen to showing the face at the back part of the all-around screen, or turns back from showing the face at the back part of the all-around screen to showing the face at the front part of the all-around screen to always keep facing the user, depending on device placement change or change in the relative position of a user and the device. The system also moves the different body parts of the human or humanoid like image to mimic talking, and making gestures and facial expressions, generates sound in synchronization with the moving mouth to mimic talking, and in synchronization of the moving body parts and clothes to mimic movement, records sound, including talking sound of any user, and converts recorded sound to input for the visual intelligent assistant, including converting speech of any user to text, and generates sound or movement of different body parts of the human or humanoid like moving image, or sound and movement, as output based on the input.

FIG. 1 is an illustration of an online platform 100 consistent with various embodiments of the present disclosure. By way of non-limiting example, the online platform 100 to facilitate presentation of an object may be hosted on a centralized server 102, such as, for example, a cloud computing service. The centralized server 102 may communicate with other network entities, such as, for example, a mobile device 106 (such as a smartphone, a laptop, a tablet computer, etc.), other electronic devices 110 (such as desktop computers, server computers, etc.), databases 114, sensors 116, and a system 118 (such as a system 300, etc.) comprising a processing device, a display device and a communication device over a communication network 104, such as, but not limited to, the Internet. Further, users of the online platform 100 may include relevant parties such as, but not limited to, end-users, administrators, service providers, and service consumers and so on. Accordingly, in some instances, electronic devices operated by the one or more relevant parties may be in communication with the platform.

A user 112, such as the one or more relevant parties, may access online platform 100 through a web-based software application or browser. The web-based software application may be embodied as, for example, but not be limited to, a website, a web application, a desktop application, and a mobile application compatible with a computing device 200.

Figure 2:
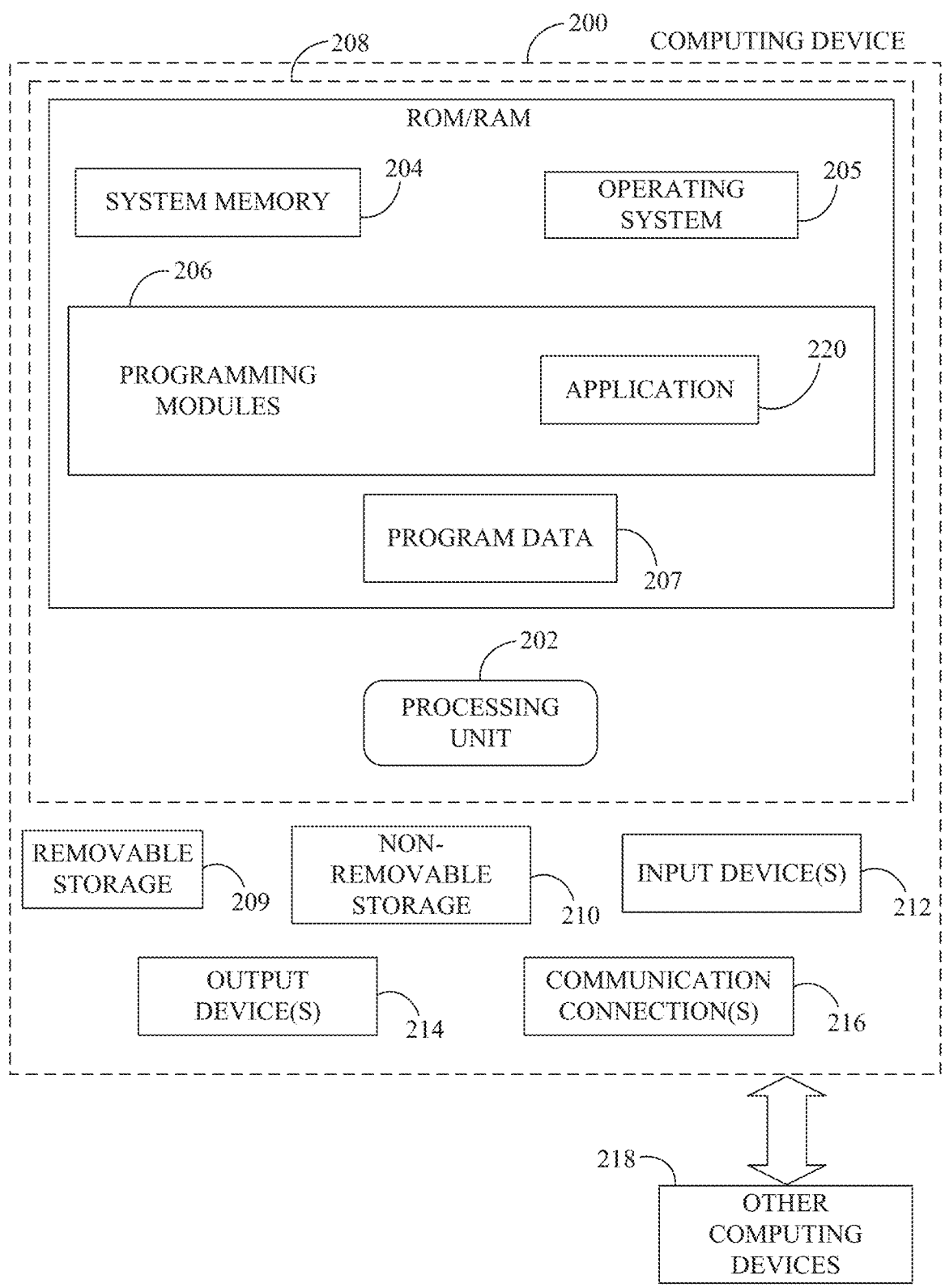
FIG. 2 is a block diagram of a computing device 200 for implementing the methods disclosed herein, in accordance with some embodiments.

With reference to FIG. 2, a system consistent with an embodiment of the disclosure may include a computing device or cloud service, such as computing device 200. In a basic configuration, computing device 200 may include at least one processing unit 202 and a system memory 204. Depending on the configuration and type of computing device, system memory 204 may comprise, but is not limited to, volatile (e.g., random-access memory (RAM)), non-volatile (e.g., read-only memory (ROM)), flash memory, or any combination. System memory 204 may include operating system 205, one or more programming modules 206, and may include a program data 207. Operating system 205, for example, may be suitable for controlling computing device 200's operation. In one embodiment, programming modules 206 may include image-processing module, machine learning module. Furthermore, embodiments of the disclosure may be practiced in conjunction with a graphics library, other operating systems, or any other application program and is not limited to any particular application or system. This basic configuration is illustrated in FIG. 2 by those components within a dashed line 208.

Computing device 200 may have additional features or functionality. For example, computing device 200 may also include additional data storage devices (removable and/or non-removable) such as, for example, magnetic disks, optical disks, or tape. Such additional storage is illustrated in FIG. 2 by a removable storage 209 and a non-removable storage 210. Computer storage media may include volatile and non-volatile, removable and non-removable media implemented in any method or technology for storage of information, such as computer-readable instructions, data structures, program modules, or other data. System memory 204, removable storage 209, and non-removable storage 210 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 200. Any such computer storage media may be part of device 200. Computing device 200 may also have input device(s) 212 such as a keyboard, a mouse, a pen, a sound input device, a touch input device, a location sensor, a camera, a biometric sensor, etc. Output device(s) 214 such as a display, speakers, a printer, etc. may also be included. The aforementioned devices are examples and others may be used.

Computing device 200 may also contain a communication connection 216 that may allow device 200 to communicate with other computing devices 218, such as over a network in a distributed computing environment, for example, an intranet or the Internet. Communication connection 216 is one example of communication media. Communication media may typically be embodied by computer readable instructions, data structures, program modules, or other data in a modulated data signal, such as a carrier wave or other transport mechanism, and may include any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer readable media as used herein may include both storage media and communication media.

As stated above, a number of program modules and data files may be stored in system memory 204, including operating system 205. While executing on processing unit 202, programming modules 206 (e.g., application 220 such as a media player) may perform processes including, for example, one or more stages of methods, algorithms, systems, applications, servers, databases as described above. The aforementioned process is an example, and processing unit 202 may perform other processes. Other programming modules that may be used in accordance with embodiments of the present disclosure may include machine learning applications.

Generally, consistent with embodiments of the disclosure, program modules may include routines, programs, components, data structures, and other types of structures that may perform particular tasks or that may implement particular abstract data types. Moreover, embodiments of the disclosure may be practiced with other computer system configurations, including hand-held devices, general purpose graphics processor-based systems, multiprocessor systems, microprocessor-based or programmable consumer electronics, application specific integrated circuit-based electronics, minicomputers, mainframe computers, and the like. Embodiments of the disclosure may also be practiced in distributed computing environments where tasks are performed by remote processing devices that are linked through a communications network. In a distributed computing environment, program modules may be located in both local and remote memory storage devices.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general-purpose computer or in any other circuits or systems.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random-access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, solid state storage (e.g., USB drive), or a CD-ROM, a carrier wave from the Internet, or other forms of RAM or ROM. Further, the disclosed methods' stages may be modified in any manner, including by reordering stages and/or inserting or deleting stages, without departing from the disclosure.

Figure 3:
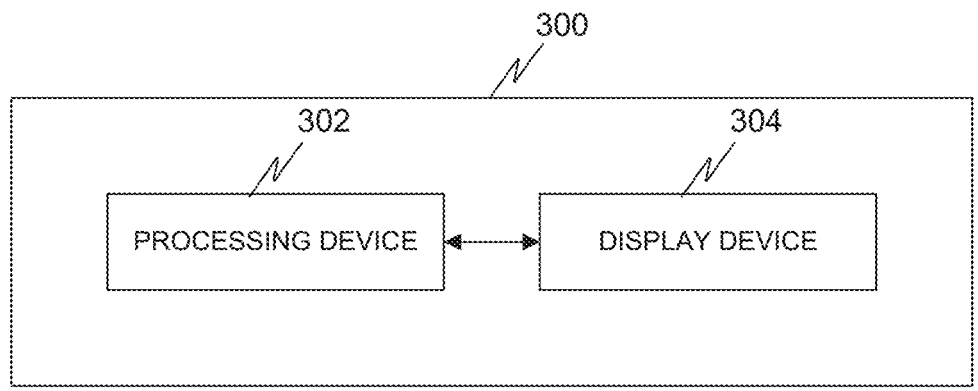
FIG. 3 illustrates a block diagram of a system 300 for facilitating presentation of an object, in accordance with some embodiments.

FIG. 3 illustrates a block diagram of a system 300 for facilitating presentation of an object, in accordance with some embodiments.

Accordingly, the system 300 may include a processing device 302 which may be configured to execute an instruction associated with presenting two or more views of an object.

In some embodiments, the processing device 302 may be an electronic device which may be configured to execute a set of instructions.

In some embodiments, the object may include a digital character comprising characteristic of one or more of a human and a humanoid. In some embodiments, the system 300 may further include an input device which may be configured to receive a preferred appearance input from the user. Further, the processing device 302 may be further configured to update the two or more display regions. Further, the updating of two or more display regions may include altering an appearance of the digital character based on the preferred appearance input. In some embodiments, the digital character may be configured to mimic one or more of an action of talking, a facial expression and a gesture. In some embodiments, the digital character may be configured to mimic the movement of a human. Further, the processing device 302 may be configured to update the two or more display regions based on movement of the digital character. In some embodiments, movement of the digital character may include moving from the first display region to the second display region. Further, in some embodiments, the digital character may be configured to interact with a user based on an input data associated with the user received from an input device.

In some embodiments, the object may include one or more of a human digital character, a humanoid digital character, an animal digital character, an animated digital character, and a non-living object. Further, the system 300 may include an input device 1002 which may be configured to receive an object selection data. Further, the processing device 302 may be configured for presenting the two or more views of the object based on the selection data.

In some embodiments, a characteristic of the object may be based on selection of a functionality characteristic from two or more characteristics. Further, the system 300 further may include the input device 1002 which may be configured to receive a data associated with the selection of the characteristic from the user.

Further, each view of the object is based on a three-dimensional model data corresponding to the object. Further, the system 300 may include a display device 304 operatively coupled with the processing device 302.

In some embodiments, the display device 304 may include an electronic device which may be configured to represent data in a visual form.

In some embodiments, the display device 304 may include a front screen and a foldable screen which may be configured to curve at the edge of the foldable screen. Further, the edge of the foldable screen may be affixed with an edge of the front screen to form a rounded side around the front screen.

In some embodiments, the display device 304 may include one or more of a front screen, a back screen, a first side screen, a second side screen, a top screen and a bottom screen. Further, each of the first side screen, the second side screen, the top screen and the bottom screen may be rounded. Further, the rounding facilitates a continuous display screen.

Further, the display device 304 may include two or more display regions which may be configured to display the two or more views of the object. Further, the two or more display regions comprising a first display region which may be configured to display a first view of the object and a second display region which may be configured to display a second view of the object.

In some embodiments, the two or more display regions may include two or more of a front display region, a back display region, a first side display region and a second side display region. In some embodiments, the front display region may be configured to display a first view of the object, the back display region may be configured to display a second view of the object, the first side region may be configured to display a third view of the object and the second side display region may be configured to display a forth view of the object. Further, in some embodiments, each of the back display region, the first side display region and the second side may be non-touch responsive. Further, the front display region may be touch responsive.

In some embodiments, the first display region may be located on a first plane corresponding to the display device 304 and the second display region may be located on a second plane corresponding to the display device 304. Further, the first plane and the second plane may be parallel to each other and separated by a spatial distance. In some embodiments, the first display region may be located on a first plane corresponding to the display device 304 and the second display region may be located on a second plane corresponding to the display device 304. Further, the first plane and the second plane may be perpendicular to each other. In some embodiments, each of a view of the two or more views corresponds to a viewing angle of the user associated with a two-dimensional representation of the object.

In some embodiments, the system 300 may further include an image sensor 602 which may be configured to generate an image of a user. Further, the processing device 302 may be further configured to analyze the image and generate a gaze data corresponding to a gaze of the user based on the analysis.

In some embodiments, the system 300 may further include a communication device 502 which may be configured to receive a characteristic data associated with the object. Further, updating of one or more display regions of the two or more display regions may be based on the characteristic data.

In some embodiments, the system 300 may further include an eye tracking device which may be configured to track a gaze of the user in relation to the two or more display regions. Further, the updating of the two or more display regions may be based on the gaze. Further, in some embodiments, the front view of the object may be displayed on a display region of the two or more display regions. Further, the gaze of the user may be on the display region.

In some embodiments, the system 300 may further include the communication device 502 which may be configured to receive an advertisement instruction. Further, the processing device 302 may be configured to execute the advertisement instruction associated with a presentation of an advertisement on the two or more display regions. In some embodiments, the advertisement may be presented by the object.

In some embodiments, the display device 304 may be enclosed by a transparent protective material.

In some embodiments, the front screen and the foldable screen may be held in place using a transparent housing.

In some embodiments, the processing device 302 may be further configured to execute an interface instruction associated with presentation of a user interface using the two or more display devices. Further, the user interface may be presented over the object.

In some embodiments, the system 300 further may include a microphone which may be configured to generate an audio data. Further, in some embodiments, the processing device 302 may be further configured to analyze the audio data. Further, the processing device 302 may be further configured to updating at least one the two or more views based on the analysis. In some embodiments, the analysis of the audio data may be based on a machine learning model. In some embodiments, the analysis may include one or more of a text-to-speech operation, speech-to-text operation and a natural language processing operation. In some embodiments, the system 300 may further include a sound generating 902 device which may be configured to produce a perceivable sound output. Further, an actuation of the sound generating device may be based on the analysis of the audio data.

In some embodiments, the system 300 may further include the input device 1002 which may be configured to receive a toggle input. Further, the processing device 302 may be configured to execute the instruction associated with presenting the two or more views of the object on the first display region of the two or more display regions.

In some embodiments, the processing device 302 may be further configured to display a user defined background on the second display region of the two or more display regions.

In some embodiments, the system 300 further may include the image sensor 602 which may be configured to generate facial data. Further, in some embodiments, the processing device 302 may be configured to analyze the facial data. Further, the processing device 302 may be configured to determine a facial feature of the user based on the analysis. Further, the digital character may be configured to one or more mimic the facial features of the user and establish an eye contact between the user and the digital character. In some embodiments, the analysis of the facial data may be based on a machine learning model. In some embodiments, the machine learning model may include a face recognition model.

In some embodiments, the system 300 may further include the communication device 502 which may be configured to receive a characteristic data associated with the object. Further, updating of the two or more display regions may be based on the characteristic data.

In some embodiments, the system 300 may further include an energy storage device which may be configured to power the processing device 302 and the display device 304.

Figure 4:
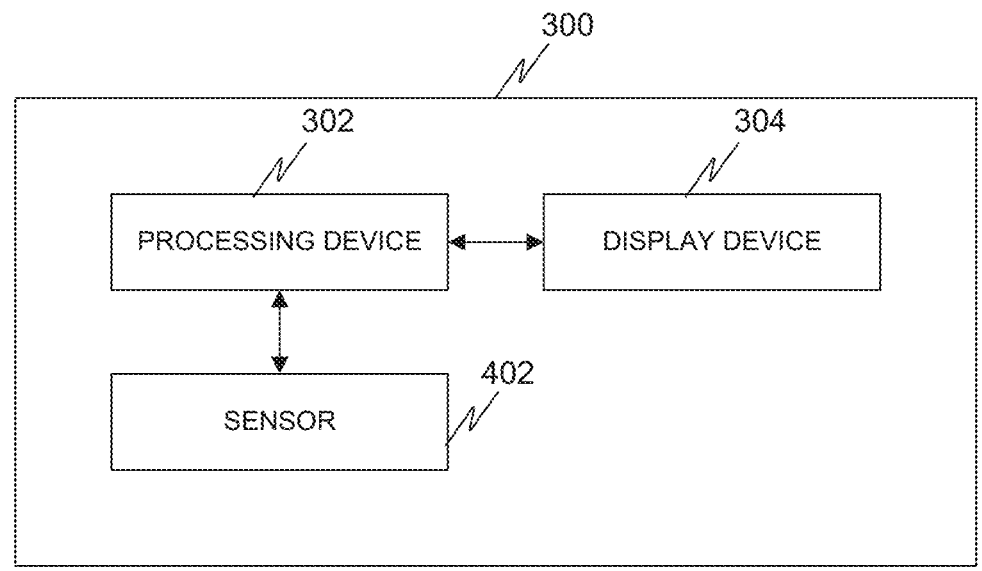
FIG. 4 illustrates a block diagram of the system 300 for facilitating presentation of an object, wherein the system 300 comprises a sensor, in accordance with some embodiments.

FIG. 4 illustrates a block diagram of the system 300 for facilitating presentation of an object, wherein the system 300 comprises a sensor, in accordance with some embodiments.

Accordingly, the system 300 may further include a sensor 402 which may be configured to determine a spatial position of a user in relation to the display device 304. Further, the processing device 302 may be configured for updating one or more display regions of the two or more display regions based on the spatial position.

In some embodiments, the sensor 402 may include a gyroscope sensor configured to detect orientation of the display device 304 in relation to the user. In some embodiments, the sensor 402 may include an accelerometer sensor configured to detect the acceleration of the display device 304 in relation to the user. In some embodiments, the sensor 402 may include an Inertial Measuring Unit (IMU) configured to detect an orientation and a movement of the display device 304 in relation to the user.

Figure 5:
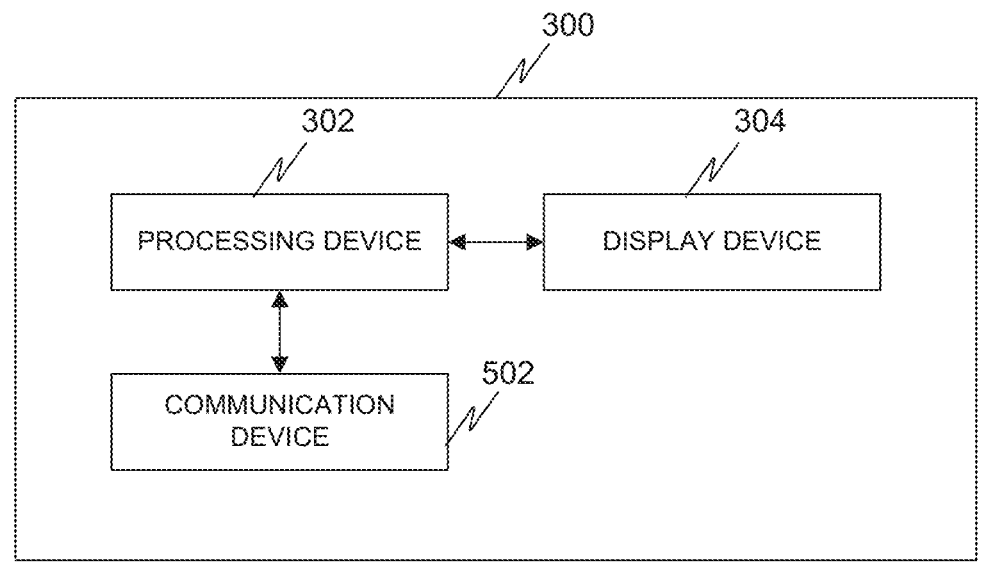
FIG. 5 illustrates a block diagram of the system 300 for facilitating presentation of an object, wherein the system 300 comprises a communication device, in accordance with some embodiments.

FIG. 5 illustrates a block diagram of the system 300 for facilitating presentation of an object, wherein the system 300 comprises a communication device, in accordance with some embodiments.

Accordingly, the system 300 may further include the communication device 502 which may be configured to receive sensor data from an external sensor.

In some embodiments, the communication device 502 may be an electronic device which may be configured to one or more of transmit and receive a data. In some embodiments, the one or more of the transmitting and the receiving of a data may be performed wirelessly.

Further, the communication device 502 may be communicatively coupled with the processing device 302. Further, the external sensor may be configured to generate one or more of a spatial data, an orientation data and a motion data corresponding to a user in relation to the display device 304. Further, the processing device 302 may be configured for updating the two or more display regions based on the one or more of the spatial data, the orientation data and the motion data.

Figure 6:
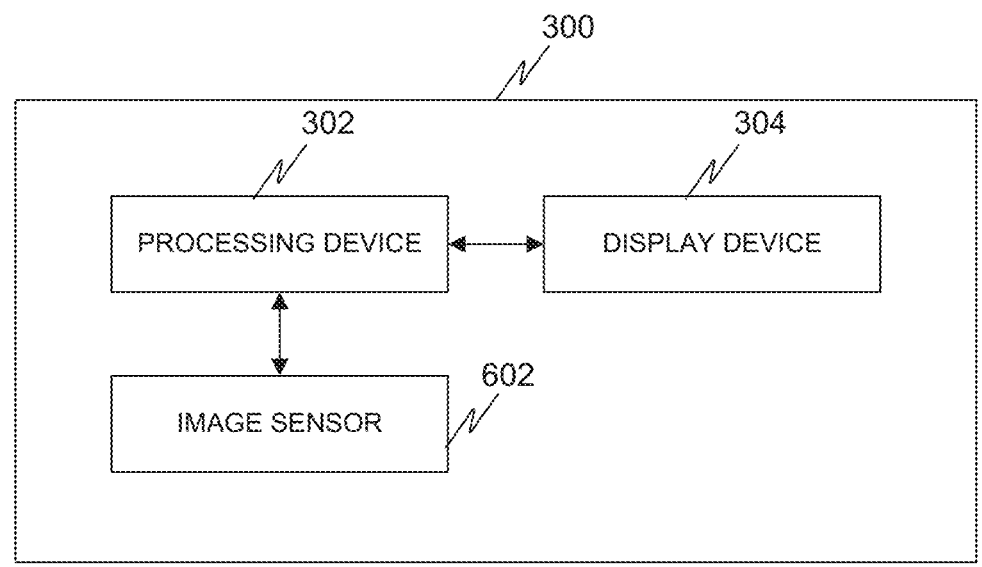
FIG. 6 illustrates a block diagram of the system 300 for facilitating presentation of an object, wherein the system 300 comprises an image sensor, in accordance with some embodiments.

FIG. 6 illustrates a block diagram of the system 300 for facilitating presentation of an object, wherein the system 300 comprises an image sensor, in accordance with some embodiments.

Accordingly, the system 300 may further include the image sensor 602 which may be configured to generate a visual data. Further, an environment associated with the object presented by one or more of a display region of the two or more display regions may be based on the visual data.

In some embodiments, the image sensor 602 may include an electronic device configured to convert a light energy into a digital signal. In some embodiments, the environment associated with the object is identical to an environment behind the display device 304. In some embodiments, a field of view of the environment presented by the display device 304 is identical to a field of view associated with the image sensor 602.

Figure 7:
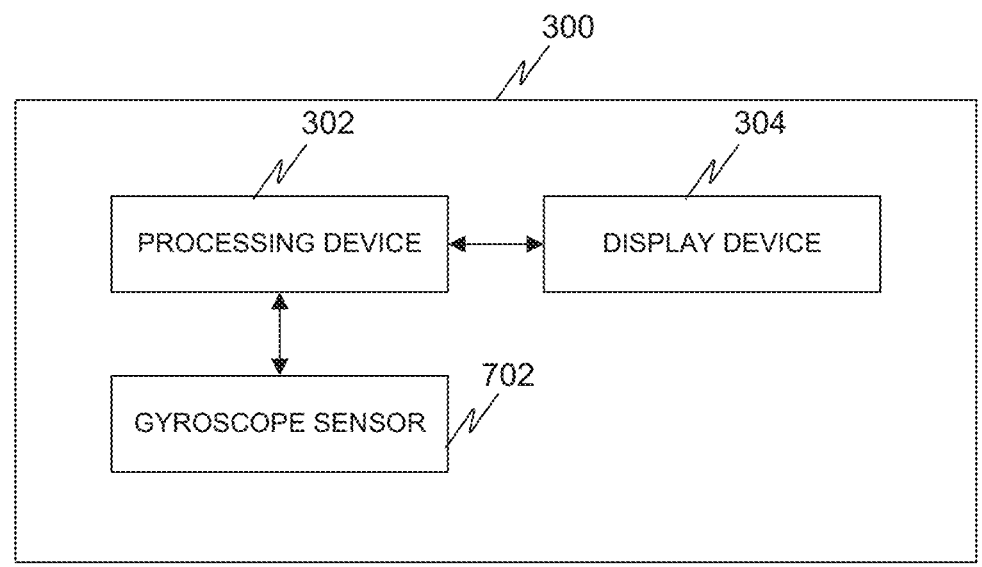
FIG. 7 illustrates a block diagram of the system 300 for facilitating presentation of an object, wherein the system 300 comprises a gyroscope sensor, in accordance with some embodiments.

FIG. 7 illustrates a block diagram of the system 300 for facilitating presentation of an object, wherein the system 300 comprises a gyroscope sensor, in accordance with some embodiments.

Accordingly, the system 300 may further include a gyroscope sensor 702 which may be configured to generate orientation data associated with an orientation of the display device 304 in relation to a user. Further, the processing device 302 may be configured for updating one or more display regions of the two or more display regions based on the orientation data.

In some embodiments, a gyroscope sensor 702 may include an electronic device configured to determine the orientation of the display device 304 in a three-dimensional space.

Figure 8:
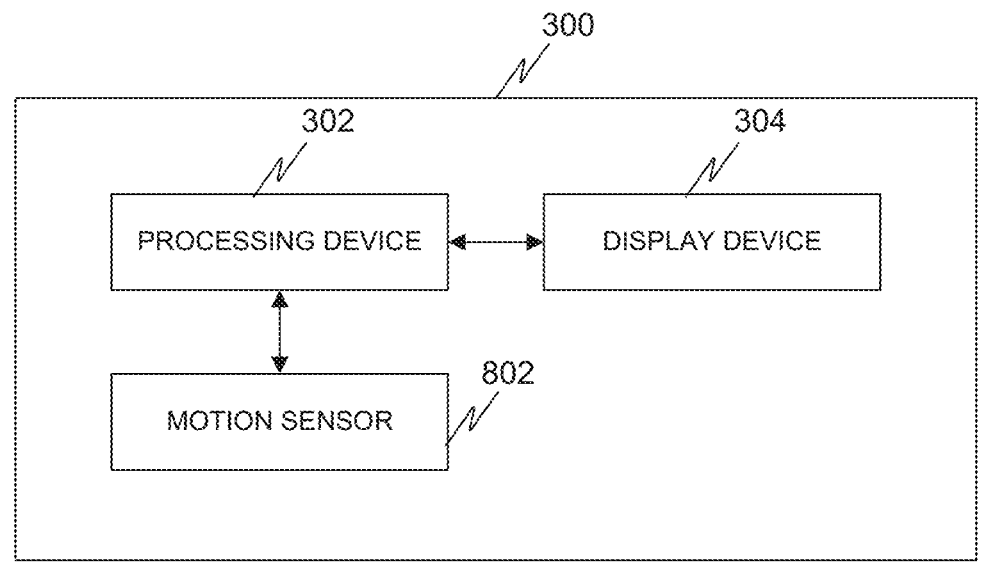
FIG. 8 illustrates a block diagram of the system 300 for facilitating presentation of an object, wherein the system 300 comprises a motion sensor, in accordance with some embodiments.

FIG. 8 illustrates a block diagram of the system 300 for facilitating presentation of an object, wherein the system 300 comprises a motion sensor, in accordance with some embodiments.

Accordingly, the system 300 may further include a motion sensor 802 which may be configured to generate a motion data based on a movement of a user in relation to the display device 304. Further, the processing device 302 may be configured for updating one or more display regions of the two or more display regions based on the motion data.

In some embodiments, the motion sensor may include an electronic device configured to detect a movement of a user in relation to the display device 304 within a field of view of the motion sensor 802. In some embodiments, the updating may include a movement of a digital character from first display region to the second display region.

Figure 9:
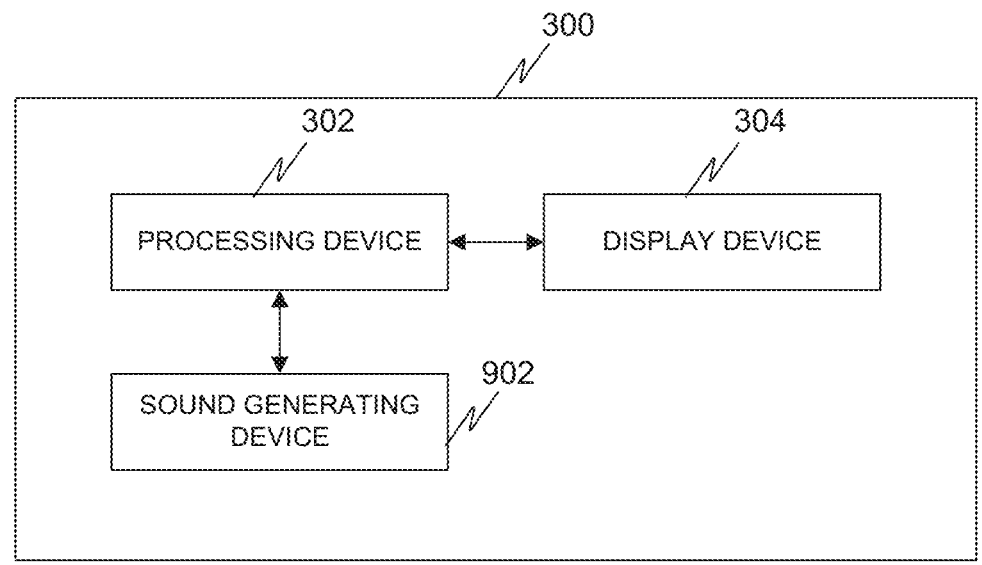
FIG. 9 illustrates a block diagram of the system 300 for facilitating presentation of an object, wherein the system 300 comprises an input device, in accordance with some embodiments.

FIG. 9 illustrates a block diagram of the system 300 for facilitating presentation of an object, wherein the system 300 comprises an input device, in accordance with some embodiments.

Accordingly, the system 300 may further include the sound generating device 902 which may be configured to actuate based on updating of a display region of the two or more display regions.

In some embodiments, the sound generating device 902 is a speaker. In some embodiments, the sound generated device 902 is actuated based upon movement of a digital character presented by the display device 304.

Figure 10:
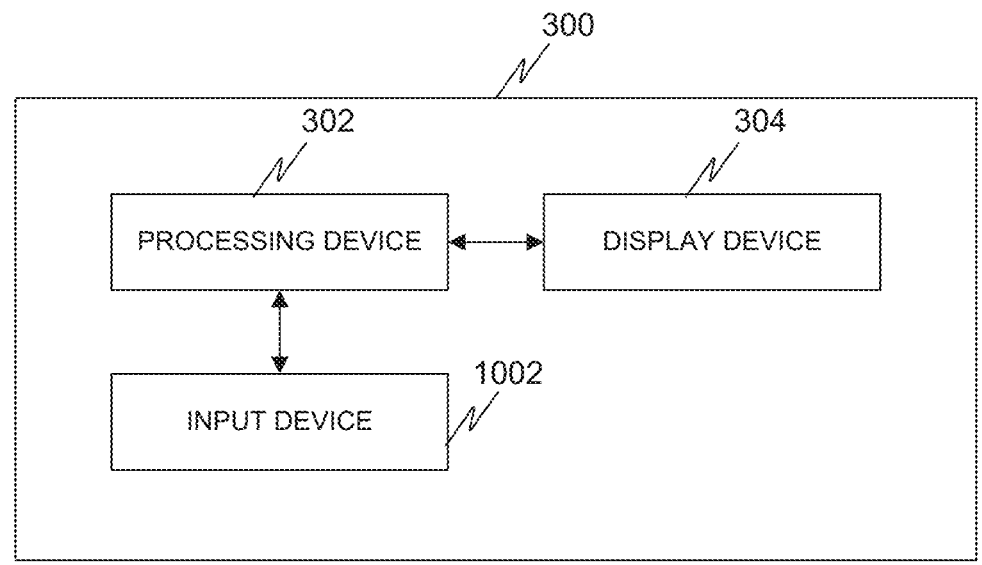
FIG. 10 illustrates a block diagram of the system 300 for facilitating presentation of an object, in accordance with some embodiments.

FIG. 10 illustrates a block diagram of the system 300 for facilitating presentation of an object, in accordance with some embodiments.

Accordingly, the system 300 may further include the input device 1002 which may be configured to receive a region selection data. Further, the processing device 302 may be configured to display the object on a display region of the two or more display regions based on the region selection data.

In some embodiments, the input device 1002 may include a touch input from a user. In some embodiments, the input device 1002 may include a button. In some embodiments, the object may be presented on one of the display regions from the plurality of the display regions based on the region selection data.

According to some embodiments, a method of manufacturing a system 300 for facilitating presentation of an object is disclosed. Further the method may include assembling each of a processing device 302 which may be configured to execute an instruction associated with presenting two or more views of an object. Further, each view of based on a three-dimensional model data corresponding to the object. Further, the method may include assembling each of a display device 304 operatively coupled with the processing device. Further, the display device 304 may include two or more display regions which may be configured to display the two or more views of the object. Further, the two or more display regions comprising a first display region which may be configured to display a first view of the object and a second display region which may be configured to display a second view of the object.

According to some embodiments, a method of provisioning of digital character to a system 300 comprises processing device 302 which may be configured to execute an instruction associated with presenting two or more views of an object. Further, each view based on a three-dimensional model data corresponding to the object and a display device 304 operatively coupled with the processing device 302. Further, the display device 304 may include two or more display regions and may be configured to display the two or more views of the object. Further, the two or more display regions may include a first display region may be configured to display a first view of the object and a second display region may be configured to display a second view of the object. Further, the method may include transmitting, using a server communication device, a digital character library data to the system 300. Further, the display device 304 may include two or more display regions and may be configured to display the two or more views of the object. Further, the method may include receiving, using the server communication device, a selection data from the system. Further, the display device 304 may include two or more display regions may be configured to display the two or more views of the object. Further, the method may include transmitting, using the server communication device, the digital character data corresponding to the selection data to the system based on the selection data.

Aspects

In terms of aspect 1, a computing and digital communication device having at least an all-around screen covering front side, back side and edges showing moving images from all sides, a sound generator and a sound recorder, the method comprising: an all-around screen, enclosed by a transparent glass or plastic case, made with a flat rectangular main front screen placed at the front side and one piece of folded non-touch all-around screen or two pieces of curved or rounded edge non-touch screen that are merged or placed close to each other to form a screen with rounded sides wrapped around the front side edges, the back side, and the rounded edges of the device and held in place by two pieces of transparent glass or plastic rounded edge case, wherein displaying the moving image on the curved or rounded edge, the front screen part, and the back screen part give a seamless all-around three-dimensional view, while the device may be hold in the hand that only is touching the non-touch all-around screen or screens, wherein the all-around screen shows a moving image representation of a human or humanoid like digital character, showing all sides of the digital character on the front side, the back side, and the edges of the device, wherein the moving image representation of the digital character may move different body parts to mimic talking, and making facial expressions and gestures, and may move mimicking natural body rotation such that front side of the moving image representation of the digital character moves from facing the front part of the screen to the back part of the screen, or moves from facing the back part of the screen to the front part of the screen, based on device placement change or change in the relative position of a user and the device; a sound generator that generates sound in synchronization with the moving mouth of the digital character to mimic talking, and in synchronization of the moving body parts and accessories to mimic real-life like movement; a sound recorder that records sound, including talking sound of any user; and one or more processing units that convert recorded sound as input, generate sound output for the sound generator, render moving image representation output of the human or humanoid like digital character and accessories from three- or two-dimensional model input, and perform tasks of generating outputs based on inputs and implement a multiple of inter-connected artificial intelligence systems, including artificial neural networks to convert speech to text, to recognize patterns from images, to convert different inputs to intelligent outputs, and a natural language processor to generate output from input text, that generate inputs for the three- or two-dimensional graphics rendering engine to produce rendered moving images on the screen and generate inputs for the sound generating systems to mimic artificial human like speaking, movements, expressions, and other artificially intelligent activities, wherein all these processing by the processing units creates the impression of a realistic intelligent digital character inside the device that socializes and performs social role plays including a friend, an assistant, or other roles in a real-life human-like way providing an intelligent and friendly interface to the device for entertainment, for performing tasks, and for operating the device.

In terms of aspect 2, the computing and digital communication device as described in aspect 1, wherein the back part and the edges of the device shows a non-moving image on the all-around screen, including but not limited to an image representing hard material back cover or a designed back cover or other images from a selection of given images or user input images, and only a front part of the screen, which is a flat rectangular main front screen placed in the all-around image screen at the front side of the device, shows the moving image representation of the digital character.

In terms of aspect 3, the computing and digital communication device as described in aspect 1, wherein the device further comprises one or more cameras that take image input, wherein the one or more processing units processes the input image to recognize a face and different parts and aspects of the face, wherein the output of the facial recognition is used for the user authentication and for making eye contacts with the user using the moving image representation of the digital character or for making intelligent movement or facial expressions of the digital character based on the facial expression of the user.

In terms of aspect 4, the computing and digital communication device as described in aspect 1, wherein the device provides multiple choices of two- or three-dimensional models of human or humanoid or other digital character, and upon user input to select one model uses that model of human or humanoid or other digital character to render the moving image representation of the model on the all-around screen of main screen through computer graphics processing.

In terms of aspect 5, the computing and digital communication device as described in aspect 4, wherein the device further comprises an input system to enter or upload one or more two- or three-dimensional models of face or body or parts of body or accessories as choices of two- or three-dimensional models of human or humanoid or other digital characters.

In terms of aspect 6, the computing and digital communication device as described in aspect 1, wherein the flat rectangular main front screen placed in the all-around screen at the front side show user input interfaces, including icons, menu, windows, drawer, tabs, or other user input interfaces, upon activation from voice or facial expression user input, and facilitates taking input from the user using user input interface including pointer, touch input, on-screen keyboard, keyboard, or other means and showing output based on the input in the form of task progress bar, texts, images, or other output, wherein the moving image representation of the digital character becomes the background behind the user input interface and the one or more processing units keeps on processing sound, voice, and image inputs as parallel alternative inputs in addition to the input from the user input interfaces.

In terms of aspect 7, the computing and digital communication device as described in aspect 1, wherein the front part of the all-around screen, which is a flat rectangular main front screen placed in the all-around image screen at the front side, comprises a touchscreen input system, wherein inputs are entered touching the touchscreen of the main front part of the all-around screen.

In terms of aspect 8, the computing and digital communication device as described in aspect 1, wherein the device further comprises one or more network communication systems, which downloads additional images or models to generate images to be used with the digital character or as an alternate digital character.

In terms of aspect 9, the computing and digital communication device as described in aspect 1, wherein the backside camera of the device captures a live moving image of the location or the surrounding of the user, while the user is looking at the front of the device, the front part of the all-around screen and the main front touch screen may show the live captured moving image of the location or the surrounding as the background for the moving image of the digital character displayed, creating an effect as if the digital character is in the same location or surrounding as the user.

In terms of aspect 10, the computing and digital communication device as described in aspect 1, wherein additional images or models are downloaded over network communication systems to generate images to be used for advertisement or other promotional purposes presented by the digital character on the all-around screen, including but not limited to holding a bottle of an advertised drink, or using a movie poster or trailer in the background, or other ways of placing the product or service with the digital character and the processing units processes graphics and sound in a way that the moving image and sound representation of the digital character actively or passively promotes the product or service on the all-around screen along with sounds generated by the sound generator.

In terms of aspect 11, a computer-implemented method of operating a digital character interface on a computing device having at least an all-around screen with front side, back side and edges showing moving images from all sides, a sound generator and a sound recorder, the method comprising: displaying the moving image representation of the digital character showing all sides of the digital character on the front side, the back side, and the edges of the all-around screen, made with a flat rectangular main front touch screen placed at the front side and one piece of folded non-touch all-around screen or two pieces of curved or rounded edge non-touch screen that are merged or placed close to each other to form a screen with rounded sides wrapped around the front side edges, the back side, and the rounded edges of the device and held in place by two pieces of transparent glass or plastic rounded edge case, enabling holding of the device in the hand for usage touching the non-touch all-around screens and providing an all-around three-dimensional view displaying the moving image on the curved or rounded edge, the front part, and the back part of the screen; moving the image representation of the digital character mimicking natural body rotation of a human such that front side of the human or humanoid like image moves from facing the front part of the screen to the back part of the screen, or moves from facing the back part of the screen to the front part of the screen, based on device placement change or change in the relative position of a user and the device; moving of the different body parts of the image representation of the digital character to mimic talking, and making gestures and facial expressions; generating sound in synchronization with the moving mouth to mimic talking, and in synchronization of the moving body parts and clothes of the digital character to mimic movement; recording sound, including talking sound of any user; converting recorded sound to input for the intelligent assistant, including converting speech of any user to text; generating sound or movement of different body parts of the digital character, or sound and movement, as output based on the input; implementing a multiple of inter-connected artificial intelligence systems, including artificial neural networks to convert speech to text, to recognize patterns from images, to convert different inputs to intelligent outputs, and a natural language processor to generate output from input text, using the one or more processing units; generating inputs for the three- or two-dimensional graphics rendering engine to produce rendered moving images on the screen and generating inputs for the sound generating systems to mimic artificial human like speaking, movements, expressions, and other human like activities; and creating the impression of a realistic intelligent digital character inside the device that socializes and performs social role plays including a friend, an assistant, or other roles in a real-life human-like way providing an intelligent and friendly interface to the device for entertainment, for performing tasks, and for operating the device through the processing by the processing units.

In terms of aspect 12, the method of operating a digital character interface on a computing device as described in aspect 11, wherein the method further comprises: showing a non-moving image, including but not limited to an image representing hard material case design or a fantasy style case design or other images from a selection of given images or user input images, on the back part and the edges of the non-touch all-around screen; only showing the moving image representation of the digital character in a real-life three-dimensional view on the front part of the screen, which is a flat rectangular main front screen placed in the all-around image screen at the front side; and holding the device in the hand touching the non-touch screens showing the non-moving image represented as a cover of the device.

In terms of aspect 13, the method of operating a digital character interface on a computing device as described in aspect 11, wherein the method further comprises: taking image input using one or more cameras; processing the input image using the one or more processing units to recognize a face and different parts and aspects of the face; using the output of the facial recognition for various purposes, including but not limited to for the user authentication, or for making eye contacts using the human or human like moving image, or for making intelligent movement or expression of the human or human like moving image based on the facial expression of the user.

In terms of aspect 14, the method of operating a digital character interface on a computing device as described in aspect 11, wherein the method further comprises: providing multiple choices of human or humanoid or other character image representations of the two- or three-dimensional models, wherein any of the human or humanoid or other character image representations of the two- or three-dimensional models are customizable by changing any body parts, clothes, color, or other attributes; selecting one of the human or humanoid or other character image representations of the two- or three-dimensional models upon user input; and using the selected human or humanoid or other character image representations of the two- or three-dimensional model or model to show the human or humanoid moving image on the screen.

In terms of aspect 15, the method of operating a digital character interface on a computing device as described in aspect 14, wherein the method further comprises: taking image input using one or more cameras, and processing the input image using the one or more processing units to build one or more three-dimensional models of a head, or a body, or parts of a body, or accessories, or otherwise entering or uploading one or more two- or three-dimensional models of a face or body or parts of body or accessories; providing that one or more three-dimensional models of a face or body or parts of body or accessories as choices for selection to be used with the chosen model of human or humanoid or other character; and using the selected model of body part or accessories in the moving image representation of the digital character after the selection from the choices.

In terms of aspect 16, the method of operating a digital character interface on a computing device as described in aspect 11, wherein the method further comprises: showing user input interfaces, including but not limited to icons, menu, windows, drawer, tabs, or other user input interfaces, on the flat rectangular main front screen placed in the all-around screen at the front side upon activation from voice or facial expression user input; and facilitating taking input from the user using pointer, touch input, on-screen keyboard, keyboard, or other means and showing output based on the input in the form of task progress bar, texts, images, or other output, wherein the human or humanoid moving image becomes the background behind the user input and output interface.

In terms of aspect 17, the method of operating a digital character interface on a computing device as described in aspect 11, wherein the method further comprises entering inputs touching the flat rectangular main front screen placed in the all-around image screen at the front side using the touch screen input system.

In terms of aspect 18, the method of operating a digital character interface on a computing device as described in aspect 11, wherein the method further comprises downloading additional images or models over one or more network communication systems to generate images to be used with the human or humanoid moving image or as an alternate human or humanoid moving image.

In terms of aspect 19, the method of operating a digital character interface on a computing device as described in aspect 11, wherein the method further comprises capturing live moving image of the location or the surrounding where the user is looking behind the device the backside camera of the device while holding the device and using the live captured moving image of the location or the surrounding as the background for the moving image of the digital character, creating an effect as if the digital character is in the same location or surrounding as the user.

In terms of aspect 20, the method of operating a digital character interface on a computing device as described in aspect 11, wherein the method further comprises: downloading additional images or models over network communication systems to generate images to be used for advertisement or other promotional purposes with the digital character on the all-around screen, including but not limited to holding a bottle of an advertised drink, or using a movie poster or trailer in the background, or other ways of placing the product or service with the digital character; and processing graphics and sound by the processing units in a way that the moving image and sound representation of the digital character actively or passively promotes the product or service on the all-around screen and generates corresponding sound using the sound generator mimicking spoken words by the digital character.

Although the invention has been explained in relation to its preferred embodiment, it is to be understood that many other possible modifications and variations can be made without departing from the spirit and scope of the disclosed system as hereinafter claimed.

What is claimed is:

1. A system for facilitating presentation of an object, wherein the system comprising:
a processing device configured to execute an instruction associated with presenting a plurality of views of an object, wherein each view is based on a three-dimensional model data corresponding to the object;
a display device operatively coupled with the processing device, wherein the display device comprises an all-around screen that comprises a plurality of display regions configured to display the plurality of views of the object, wherein the plurality of display regions comprising a first display region configured to display a first view of the object and a second display region configured to display a second view of the object; and
a sensor coupled with the processing device, wherein the sensor is configured to determine a spatial position of a user in relation to the display device, wherein the processing device is further configured for updating at least one display region of the plurality of display regions based on the spatial position, wherein the all-around screen displays the plurality of views of the object on all sides of the display device, wherein the system comprises a first mode in which the plurality of views of the object are displayed on all of the plurality of display regions, and a second mode in which only one display region of the plurality of display regions displays a view of the object and the other display regions of the plurality of display regions displays non-moving images.

2. The system of claim 1 further comprising a communication device configured to receive sensor data from an external sensor, wherein the communication is communicatively coupled with the processing device, wherein the external sensor is configured to generate at least one of a spatial data, an orientation data and a motion data corresponding to a user in relation to the display device, wherein the processing device is further configured for updating the plurality of display regions based on the at least one of the spatial data, the orientation data and the motion data.

3. The system of claim 1 further comprising an image sensor configured to generate a visual data, wherein an environment associated with the object presented by at least one of a display region of the plurality of display regions is based on the visual data.

4. The system of claim 1, wherein the object comprises a digital character comprising characteristic of at least one of a human and a humanoid.

5. The system of claim 1 further comprising a gyroscope sensor configured to generate orientation data associated with an orientation of the display device in relation to a user, wherein the processing device is further configured for updating at least one display region of the plurality of display regions based on the orientation data.

6. The system of claim 1 further comprising a motion sensor configured to generate a motion data based on a movement of a user in relation to the display device, wherein the processing device is further configured for updating at least one display region of the plurality of display regions based on the motion data.

7. The system of claim 1 further comprising an image sensor configured to generate an image of a user, wherein the processing device is further configured to analyze the image and generate a gaze data corresponding to a gaze of the user based on the analysis.

8. The system of claim 1, wherein the first display region is located on a first plane corresponding to the display device and the second display region is located on a second plane corresponding to the display device, wherein the first plane and the second plane are parallel to each other and separated by a spatial distance.

9. The system of claim 1, wherein the first display region is located on a first plane corresponding to the display device and the second display region is located on a second plane corresponding to the display device, wherein the first plane and the second plane are perpendicular to each other.

10. The system of claim 1, wherein the display device comprises a front screen and a foldable screen configured to curve at the edge of the foldable screen, wherein the edge of the foldable screen is affixed with an edge of the front screen to form a rounded side around the front screen.

11. The system of claim 1 further comprising a communication device configured to receive a characteristic data associated with the object, wherein updating of at least one display region of the plurality of display region is based on the characteristic data.

12. The system of claim 1, wherein the plurality of display regions comprises two or more of a front display region, a back display region, a first side display region and a second side display region.

13. The system of claim 12, further comprising a sound generating device configured to actuate based on updating of a display region of the plurality of display regions.

14. The system of claim 13, wherein each of the back display region, the first side display region and the second side are non-touch responsive, wherein the front display region is touch responsive.

15. The system of claim 1 further comprising an input device configured to receive a region selection data, wherein the processing device is further configured to display the object on a display region of the plurality of display regions based on the region selection data.

16. A system for facilitating presentation of an object, wherein the system comprising:
   a processing device configured to execute an instruction associated with presenting a plurality of views of an object, wherein each view is based on a three-dimensional model data corresponding to the object;
   a display device operatively coupled with the processing device, wherein the display device comprises an all-around screen that comprises a plurality of display regions configured to display the plurality of views of the object, wherein the plurality of display regions comprising a first display region configured to display a first view of the object and a second display region configured to display a second view of the object; and
   a sensor coupled with the processing device, wherein the sensor is configured to determine a spatial position of a user in relation to the display device, wherein the processing device is further configured for updating at least one display region of the plurality of display regions based on the spatial position, wherein the all-around screen displays the plurality of views of the object on all sides of the display device, wherein the system comprises a first mode in which the plurality of views of the object are displayed on all of the plurality of display regions, and a second mode in which only one display region of the plurality of display regions displays a view of the object and the other display regions of the plurality of display regions displays non-moving images.

17. A system for facilitating presentation of an object, wherein the system comprising:
   a processing device configured to execute an instruction associated with presenting a plurality of views of a digital character comprising characteristic of at least one of a human and a humanoid, wherein each view is based on a three-dimensional model data corresponding to the digital character;
   a display device operatively coupled with the processing device, wherein the display device comprises an all-around screen that comprises a plurality of display regions configured to display the plurality of views of the digital character, wherein the plurality of display regions comprising a first display region configured to display a first view of the digital character and a second display region configured to display a second view of the digital character; and
   a sensor coupled with the processing device, wherein the sensor is configured to determine a spatial position of a user in relation to the display device, wherein the processing device is further configured for updating at least one display region of the plurality of display regions based on the spatial position, wherein the all-around screen displays the plurality of views of the digital character on all sides of the display device, wherein the system comprises a first mode in which the plurality of views of the digital character are displayed on all of the plurality of display regions, and a second mode in which only one display region of the plurality of display regions displays a view of the digital character and the other display regions of the plurality of display regions displays non-moving images.

18. The system of claim 17 further comprises an input device configured to receive a user input data from a user, wherein the input device is communicatively coupled with the processing device, wherein the processing device is further configured for updating the plurality of views of the digital character is based on the user input data.

19. The system of claim 17, wherein the digital character is configured to interact with a user based on an input data associated with the user received from an input device.

\* \* \* \* \*